US009056519B2

(12) United States Patent
Goscha et al.

(10) Patent No.: US 9,056,519 B2
(45) Date of Patent: Jun. 16, 2015

(54) AMBIENT CURE SOLVENT-BASED COATINGS FOR WRITABLE-ERASABLE SURFACES

(75) Inventors: John Goscha, Boston, MA (US); Martin Douglas Donbrosky, Jr., Lambertville, MI (US)

(73) Assignee: IDEAPAINT, INC., Cambridge, MA (US)

( * ) Notice: Subject to any disclaimer, the term of this patent is extended or adjusted under 35 U.S.C. 154(b) by 894 days.

(21) Appl. No.: 12/505,167

(22) Filed: Jul. 17, 2009

(65) Prior Publication Data
US 2010/0092671 A1 Apr. 15, 2010

Related U.S. Application Data

(60) Provisional application No. 61/082,029, filed on Jul. 18, 2008.

(51) Int. Cl.
*B05D 5/00* (2006.01)
*B43L 1/00* (2006.01)
*C08G 18/08* (2006.01)
*C08G 18/62* (2006.01)
*C08G 18/73* (2006.01)
*C09D 175/04* (2006.01)

(52) U.S. Cl.
CPC ............ *B43L 1/00* (2013.01); *Y10T 428/24364* (2015.01); *Y10T 428/269* (2015.01); *B43L 1/002* (2013.01); *C08G 18/0852* (2013.01); *C08G 18/6229* (2013.01); *C08G 18/73* (2013.01); *C09D 175/04* (2013.01)

(58) Field of Classification Search
USPC .................. 427/256; 359/443, 447, 452, 455; 428/325, 424.6
See application file for complete search history.

(56) References Cited

U.S. PATENT DOCUMENTS

| | | | |
|---|---|---|---|
| 3,949,132 A | 4/1976 | Seregely et al. | |
| 4,184,885 A | 1/1980 | Pasco et al. | |
| 4,387,181 A | 6/1983 | Brown et al. | |
| 4,525,216 A | 6/1985 | Nakanishi | |
| 4,786,558 A | 11/1988 | Sumiya et al. | |
| 4,818,790 A | 4/1989 | Ooka et al. | |
| 5,024,898 A | 6/1991 | Pitts et al. | |
| 5,037,702 A | 8/1991 | Pitts et al. | |
| 5,138,015 A * | 8/1992 | Yagii et al. ...................... 528/44 |

(Continued)

FOREIGN PATENT DOCUMENTS

| | | | |
|---|---|---|---|
| AU | 535 211 B2 | 2/1979 | |
| AU | 535 211 B2 | 3/1984 | |

(Continued)

OTHER PUBLICATIONS

International Search Report for PCT/US2011/035396, mailed on Oct. 12, 2011 (6 pages).

(Continued)

*Primary Examiner* — Xiao Zhao
(74) *Attorney, Agent, or Firm* — Choate, Hall & Stewart, LLP

(57) ABSTRACT

Solvent-based coatings having writable-erasable surfaces are provided. The coatings have many desirable attributes. For example, the coatings cure rapidly under ambient conditions, have low VOC emissions upon curing, and have reduced tendency to form ghost images, even after prolonged normal use.

24 Claims, 3 Drawing Sheets

(56) References Cited

U.S. PATENT DOCUMENTS

| | | | |
|---|---|---|---|
| 5,153,252 A | 10/1992 | Skora | |
| 5,227,414 A | 7/1993 | Ernst et al. | |
| 5,310,611 A | 5/1994 | Okabe et al. | |
| 5,338,793 A | 8/1994 | Loftin | |
| 5,360,642 A | 11/1994 | Chandalia et al. | |
| 5,412,021 A | 5/1995 | Nakanishi | |
| 5,629,403 A | 5/1997 | Hicks et al. | |
| 5,637,638 A | 6/1997 | Chandler et al. | |
| 5,677,363 A | 10/1997 | Imagawa | |
| 5,852,111 A | 12/1998 | Watanabe et al. | |
| 5,977,269 A | 11/1999 | Kovar et al. | |
| 6,031,023 A | 2/2000 | Carroll et al. | |
| 6,114,489 A | 9/2000 | Vicari et al. | |
| 6,133,395 A * | 10/2000 | Miyata et al. | 528/28 |
| 6,265,074 B1 | 7/2001 | Shah et al. | |
| 6,277,485 B1 | 8/2001 | Invie et al. | |
| 6,306,508 B1 | 10/2001 | Black et al. | |
| 6,310,127 B1 | 10/2001 | Jablon | |
| 6,326,437 B1 | 12/2001 | Tsuda et al. | |
| 6,350,806 B1 | 2/2002 | Tsuda et al. | |
| 6,379,001 B1 | 4/2002 | Tomida et al. | |
| 6,383,651 B1 | 5/2002 | Weinert et al. | |
| 6,423,418 B1 | 7/2002 | Callicott et al. | |
| 6,476,965 B1 * | 11/2002 | He et al. | 359/455 |
| 6,541,552 B1 | 4/2003 | Tsuda et al. | |
| 6,579,966 B1 | 6/2003 | Weinert et al. | |
| 6,580,481 B2 | 6/2003 | Ueda et al. | |
| 6,620,500 B2 | 9/2003 | Sweet et al. | |
| 6,686,051 B1 | 2/2004 | Weinert et al. | |
| 6,703,452 B2 | 3/2004 | Huynh-Ba | |
| 6,767,591 B2 | 7/2004 | Meccia et al. | |
| 6,878,414 B2 | 4/2005 | Meccia et al. | |
| 7,001,952 B2 | 2/2006 | Faler et al. | |
| 2002/0058722 A1 * | 5/2002 | Leenslag et al. | 521/155 |
| 2002/0072472 A1 * | 6/2002 | Furuya et al. | 503/201 |
| 2003/0083416 A1 | 5/2003 | Kaufhold et al. | |
| 2003/0216516 A1 | 11/2003 | Swarup et al. | |
| 2004/0018345 A1 * | 1/2004 | Athorn-Telep et al. | 428/195.1 |
| 2004/0019160 A1 | 1/2004 | Dai et al. | |
| 2004/0077497 A1 | 4/2004 | Korane et al. | |
| 2004/0081844 A1 * | 4/2004 | Bharti et al. | 428/523 |
| 2004/0121080 A1 * | 6/2004 | Urscheler et al. | 427/420 |
| 2005/0158113 A1 * | 7/2005 | Wehmeyer | 401/23 |
| 2005/0281999 A1 * | 12/2005 | Hofmann et al. | 428/304.4 |
| 2006/0024461 A1 | 2/2006 | Gustafson et al. | |
| 2006/0024463 A1 | 2/2006 | Gustafson et al. | |
| 2006/0024504 A1 | 2/2006 | Nelson et al. | |
| 2006/0287217 A1 | 12/2006 | Keilman et al. | |
| 2007/0072989 A1 | 3/2007 | Piret et al. | |
| 2007/0091073 A1 | 4/2007 | Nakata et al. | |
| 2007/0142517 A1 | 6/2007 | Anderson et al. | |
| 2007/0167324 A1 | 7/2007 | Juang | |
| 2008/0286744 A1 * | 11/2008 | Cheris et al. | 434/408 |
| 2009/0148603 A1 | 6/2009 | Goscha | |
| 2009/0155462 A1 | 6/2009 | Flosbach et al. | |

FOREIGN PATENT DOCUMENTS

| | | |
|---|---|---|
| CN | 1402755 A | 3/2003 |
| DE | 102006056690 | 1/2008 |
| EP | 414375 | 2/1991 |
| EP | 659791 | 6/1995 |
| JP | 04148925 | 5/1992 |
| JP | 06344655 | 12/1994 |
| JP | 10896 | 1/1998 |
| JP | 10203084 | 8/1998 |
| JP | 2000-178504 A | 6/2000 |
| JP | 2001-011140 A | 1/2001 |
| JP | 2002539320 A | 11/2002 |
| JP | 200731485 | 2/2007 |
| WO | WO-0055269 A1 | 9/2000 |
| WO | WO 01/34714 | 5/2001 |
| WO | WO 2004/020221 | 3/2004 |
| WO | WO 2004/020221 A1 | 3/2004 |
| WO | WO 2006/044376 | 4/2006 |
| WO | WO 2009/009273 A1 | 1/2009 |
| WO | WO 2009/011694 | 1/2009 |
| WO | WO 2009/011694 A1 | 1/2009 |
| WO | WO 2010/009384 | 1/2010 |
| WO | WO 2010/009384 A1 | 1/2010 |

OTHER PUBLICATIONS

Written Opinion for PCT/US2011/035396, mailed on Oct. 12, 2011 (12 pages).
European Search Report, PCT/US2009/050976, Mar. 1, 2012. 9 pages.
Annex to Form PCT/ISA/206, Communication Relating to the Results of the Partial International Search for PCT/US2011/035396, mailed Aug. 5, 2011.
International Search Report and the Written Opinion of the International Searching Authority of International Application No. PCT/US07/73524 mailed Apr. 1, 2009 (11 pages).
International Search Report and the Written Opinion of the International Searching Authority of International Application No. PCT/US2009/050976 mailed Aug. 27, 2009 (10 pages).
European Search Report, 10150298.7, Mar. 23, 2012. 3 pages.
Second Office Action for CN 200980136576.8, 32 pages (Oct. 18, 2013).
First Office Action for CN 200980136576.8, 12 pages (Dec. 4, 2012).
Office Action for JP 2011-518933, 7 pages (Mar. 22, 2013).
Written Opinion for SG 201100316-7, 10 pages (Nov. 21, 2012).
Paint Description, Whitey board, Think out loud, (1 page).
Material Safety Data Sheet, Whitey board, Think out loud, (2 pages), Jan. 2012.
Paquepintes, (1page), Mar. 15, 2012.
Scribi Whiteboardverf Gamma, (1 page), Mar. 15, 2012.
Sketch pintura para pizarron, (1 page), Mar. 15, 2012.
Material Safety Data Sheet—Part A and B, Wink wallsloveink.com, (12 pages), Date of Preparation Jan. 1, 2011.
European Search Report for PCT/US2009/050976, mail on Jan. 3, 2012 (9 pages).
Material Safety Data Sheet, SPECLT HP 6PK Dry Erase Activator, Identification 241119, revision date Oct. 20, 2011 (5 pages).
Material Safety Data Sheet, SEM-SPECLT QT 4PK Dry Erase Base, Identification 241118, revision date Nov. 28, 2011 (5 pages).
Write Up Dry Erase Paint, writeUp h2o fact sheet, (1 page).
Resene Write-on Wall Paint, Resene, Dec. 2009, (2 pages).

\* cited by examiner

AMBIENT CURE SOLVENT-BASED COATINGS FOR WRITABLE-ERASABLE SURFACES

CROSS-REFERENCE TO RELATED APPLICATIONS

This application claims priority from U.S. Provisional Patent Application Ser. No. 61/082,029, filed on Jul. 18, 2008, which is incorporated herein by reference in its entirety.

TECHNICAL FIELD

This disclosure relates to solvent-based coatings for writable-erasable surfaces, products that include such coatings, and to the methods of making and using the same.

BACKGROUND

Classroom education has traditionally relied upon a "blackboard" and chalk as an instruction medium. This technique can be messy, dusty, and many blackboards cannot be used with all chalk types and colors. The dust generated can lead to many respiratory afflictions. Overhead projectors, laptop computers, and dry erase boards (often referred to commonly as "whiteboards") are alternatives to traditional blackboards.

Dry erase boards typically include a substrate, such as paper or board, and a coating, such as a lacquer coating, extending upon the substrate. The coating provides a writing surface that can be marked using dry erase marking pens. Dry erase marking pens, which are typically felt tip marking instruments, contain inks that not only can mark such surfaces, but also can be erased with minimal effort using, e.g., a dry eraser, cloth, or paper tissue.

The erasability of dry erase inks from the writing surfaces of dry erase boards can deteriorate over time, resulting in the formation of non-removable "ghost images." In addition, such surfaces can be incompatible with some dry erase markers, and can be permanently marked if inadvertently written on with a permanent marker.

SUMMARY

This disclosure relates to coatings having writable-erasable surfaces, products that include such coatings (e.g., whiteboards), and to methods of making and using the same. Generally, the coatings having the writable-erasable surfaces are produced from one or more precursor materials in a solvent-based carrier; the coatings cure under ambient conditions. When the writable-erasable surface is marked with a marking material, the marking material can be erased to be effectively invisible (e.g., substantially invisible) with little or no ghosting, even after prolonged and repeated use. The one or more materials that form the coatings emit minimal volatile organic compounds (VOCs) after curing on the substrate. The resulting coatings have many desirable attributes, including one or more of the following: low porosity, low surface roughness, high elongation at break, high Taber abrasion resistance, and high Sward hardness. Generally, while not intending to be bound by any theory, it is believed that the low porosity of the coatings makes the coatings substantially impervious to the marking materials, while the low surface roughness prevents the marking materials from becoming entrapped on the surface beyond effective reach of an eraser.

In one aspect of the disclosure, a writable-erasable product includes a cured coating (such as a cross-linked coating) extending upon a substrate and having a writable-erasable surface. The coating can be cured under ambient conditions, and can be formed from one or more materials each independently including one or more substances including one or more isocyanate groups, or one or more substances including one or more hydroxyl groups. At least one of one or more materials can be in a solvent-based carrier. After the writable-erasable surface is marked with a marking material including a colorant and a solvent, the marking material can be erased from the writable-erasable surface to be effectively invisible (e.g., substantially invisible).

In another aspect, the disclosure describes a writable-erasable product including a cured coating extending upon a substrate and having a writable-erasable surface. The coating can be cured under ambient conditions, and can be formed from one or more materials including one or more of hexamethylene diisocyanate, its oligomers or homopolymers; one or more materials including one or more of an acrylic polyol; and one or more of an accelerator. At least one of one or more materials can be in a solvent-based carrier. After the writable-erasable surface is marked with a marking material including a colorant and a solvent, the marking material can be erased from the writable-erasable surface to be effectively invisible (e.g., substantially invisible).

In another aspect, the disclosure describes a method of making a writable-erasable product, the method includes applying a coating to a substrate, and curing the coating (e.g., under ambient conditions) to provide a cured coating defining a writable-erasable surface. The coating can be formed from one or more materials each independently including one or more substances including isocyanate groups, or one or more substances including hydroxyl groups. At least one of one or more materials can be in a solvent-based carrier. After the writable-erasable surface is marked with a marking material including a colorant and a solvent, the marking material can be erased from the writable-erasable surface to be effectively invisible (e.g., substantially invisible).

In another aspect, the disclosure describes a method of changeably presenting information including marking the writable-erasable surface, described herein, with a first information using a marking material including a colorant and a solvent. The first information can be erased (e.g., by applying an eraser to the writable-erasable surface) from the writable-erasable surface to be effectively (e.g., substantially) invisible. This is followed by marking the writable-erasable surface with a second information and again erasing the marking of the second information from the writable-erasable surface to be effectively (e.g., substantially) invisible.

In some implementations, the marking and erasing of information can be performed repeatedly.

In another aspect, the disclosure describes a composition including an aliphatic diisocyanate or their homopolymers and oligomers, an acrylic polyol, an organic solvent, and optionally an accelerator and/or an acid promoter.

In some implementations, the composition can include titanium dioxide, a surface additive, a wetting agent, a defoaming agent, a pigment, or a colorant.

In another aspect, the disclosure describes a writable-erasable product including a cured coating extending upon a substrate and having a writable-erasable surface. The coating can cure under ambient conditions and can be formed from one or more materials. At least one of one or more materials can be in a solvent-based carrier. After the writable-erasable surface is marked with a marking material including a colorant and a solvent, the marking material can be erased from the writable-erasable surface to be effectively invisible (e.g., substantially invisible).

In some implementations, the one or more materials can be an epoxy resin, an acrylic monomer, a vinyl monomer, or an alkyd resin other than an urethane alkyd.

The one or more of the above aspects of the disclosure can include one or more of the following implementations.

In some implementations, the cured coating and/or the writable-erasable surface may have one or more of the following attributes. The coating may have a porosity of less than about 40 percent; a thickness of from about 0.001 inch to about 0.125 inch; a Taber abrasion value of from about 100 mg/thousand cycles to about 125 mg/thousand cycles; a Sward hardness of greater than about 10; an elongation at break of between about 5 percent and about 400 percent; a sag resistance of between about 4 mils and about 24 mils. The writable-erasable surface can be erased to be substantially invisible after writing and erasing at the same position for more than about 100 cycles, or even more than about 5,000 cycles. The writable-erasable surface can have an average surface roughness ($R_a$) of less than about 7,500 nm; a maximum surface roughness ($R_m$) of less than about 10,000 nm; a contact angle of greater than about 35 degrees; a contact angle of less than about 150 degrees.

In some implementations, the one or more substances including one or more isocyanate groups can be selected from hexamethylene diisocyanate (HDI), tetramethylene diisocyanate, octamethylene diisocyanate, decamethylene diisocyanate, 2-methylpentane-1,5-diisocyanate, toluene diisocyanate (TDI), diphenylmethane diisocyanate (MDI), m- and p-phenylene diisocyanates, bitolylene diisocyanate, cyclohexane diisocyanate (CHDI), bis-(isocyanatomethyl)cyclohexane (H6XDI), dicyclohexylmethane diisocyanate (H12MDI), dimer acid diisocyanate (DDI), trimethyl hexamethylene diisocyanate, lysine diisocyanate and its methyl ester, methyl cyclohexane diisocyanate, 1,5-napthalene diisocyanate, xylene diisocyanate, polyphenylene diisocyanates, isophorone diisocyanate (IPDI), hydrogenated methylene diphenyl isocyanate (HMDI), tetramethyl xylene diisocyanate (TMXDI), or their oligomers and homopolymers, and their mixtures.

In some implementations, the one or more materials including one or more isocyanate groups includes aliphatic diisocyanates (e.g., hexamethylene-1,6-diisocyanate, IPDI and the like) or their oligomers and homopolymers, and their mixtures.

In some implementations, the one or more materials including one or more isocyanate groups includes a polymeric material (e.g., homopolymer hexamethylene-1,6-diisocyanate).

In some implementations, the one or more substances including one or more hydroxyl groups includes an $\alpha,\omega$-diol.

In some implementations, the one or more substances including one or more hydroxyl groups includes a polymeric material (e.g., an acrylic polyol, or an acrylic based diol).

In some implementations, the one or more materials including one or more hydroxyl groups also includes a cross-linking agent.

In some implementations, the accelerator includes dibutyltin dilaurate.

In some implementations, the one or more materials forming the coating further includes an acid promoter such as a carboxylic acid (e.g., acetic acid, propionic acid, butanoic acid, phosphoric acid, citric acid and the like).

In some implementations, the solvent-based carrier can include hydrocarbons (such as saturated hydrocarbons and unsaturated hydrocarbons), alcohols (such as alkoxy alcohols, ketonic alcohols), ketones, esters (such as acetates), mineral spirits, bio-based solvents or mixtures thereof. Examples of such solvents can include ethyl benzene, toluene, xylene, naphtha (petroleum), petroleum distillates, n-butyl acetate, methyl iso-amyl ketone, Stoddard solvent, t-butyl acetate, acetone, isopropyl alcohol, 2-butoxyethanol, toluene, methanol, propanol, 2-butanol, iso-amyl alcohol, methyl amyl alcohol, pentane, heptane, odorless mineral spirits, methyl ethyl ketone, diacetone alcohol, methyl amyl ketone, ethyl amyl ketone, diisobutyl ketone, methyl heptyl ketone, ethyl acetate, isopropyl acetate, propyl acetate, isobutyl acetate, n-butyl acetate, glycol ether EM acetate, amyl acetate, isobutyl isobutyrate, glycol ether EE acetate, glycol ether EB acetate, 2-ethylhexyl acetate, glycol ether DE acetate, glycol DB acetate, methyl isobutyl ketone, dipropylene glycol butoxy ether, vegetable oil, corn oil, sunflower oil or their mixtures.

In some implementations, the substrate can be selected from the group consisting of cellulosic material, glass, wall (such as plaster or painted wall), fiber board (e.g., a whiteboard in which the cured coating can be extending upon a fiber board), particle board (e.g., a chalkboard or blackboard), gypsum board, wood, plastics (such as high density polyethylene (HDPE), low density polyethylene (LDPE), or a acrylonitrile, butadiene, styrene (ABS)-based material), densified ceramics, stone (such as granite), and metal (such as aluminum or stainless steel).

In some implementations, the substrate can be selected from a flexible film or a rigid structure.

In some implementations, the marking material includes a solvent including water, alcohols (such as alkoxy alcohols, ketonic alcohols), ketones, esters (such as acetates), mineral spirits, bio-based solvents, or their mixtures.

In some implementations, the marking material can be erased from the writable-erasable surface to be effectively invisible by wiping the marks with an eraser including a fibrous material (such as a paper towel, rag, or felt material).

In some implementations, the eraser is dry or includes water, alcohol (e.g., ethanol, n-propanol, isopropanol, n-butanol, isobutanol, benzyl alcohol), alkoxy alcohol (e.g., 2-(n-propoxy)ethanol, 2-(n-butoxy)ethanol, 3-(n-propoxy)ethanol), ketone (e.g., acetone, methyl ethyl ketone, methyl n-butyl ketone), ketonic alcohol (e.g., diacetone alcohol), ester (e.g., methyl succinate, methyl benzoate, ethyl propanoate), acetate (e.g., methyl acetate, ethyl acetate, n-butyl acetate, t-butyl acetate), mineral spirit, or mixtures thereof.

In some implementations, the writable-erasable product can take the form of a whiteboard, in which the cured coating extends upon a fiberboard; can form a part of a wall e.g., of a structure; or can form a plurality of sheets, each sheet including a substrate (e.g., in the form of a paper) having the cured coating extending thereupon.

In some implementations, the coating can be prepared by combining the one or more materials including one or more isocyanate groups, and the one or more materials including one or more hydroxyl groups.

In some implementations, prior to combining, the one or more materials including one or more isocyanate groups can be in a first container, and the one or more materials including one or more hydroxyl groups can be in a second container.

In some implementations, the erasing is performed by applying an eraser (such as including a fibrous material) to the writable-erasable surface.

In some implementations, the eraser includes water, alcohols (such as alkoxy alcohols, ketonic alcohols), ketones, esters (such as acetates), mineral spirit, or their mixtures.

Implementations and/or aspects may include one or more of the following advantages. The coating surfaces are writable and erasable. The coatings can provide writing surfaces that exhibit little or no image ghosting, even after prolonged normal use. The coatings can be simple to prepare, and can be applied to many different substrates, including both porous (e.g., paper) and non-porous substrates (e.g., densified ceramics). The coatings can be applied to various substrates including, but not limited to, chalkboards (e.g., blackboards), whiteboards, drywalls, gypsum boards, plaster and painted walls. The solvent based coatings can be applied on the substrate on-site rather than being manufactured in a factory. For many substrates, a single coating can provide an adequate writable-erasable surface. The coatings can exhibit good adhesive strength to many substrates. Coating components (prior to mixing) can have an extended shelf-life, e.g., up to about three years or even up to six years. The coatings can be readily resurfaced. The coatings can cure rapidly, e.g., in less than 4 hours, under ambient conditions. The coatings can resist yellowing, as determined by ASTM method G-154, for an extended period of time (e.g., up to 2000 hours or even up to 5000 hours). The coatings do not require UV light or high-energy radiation, such as a beam of electrons, for curing. Nevertheless, in some implementations, light, e.g., UV light, or heat can be utilized to enhance the curing rate. The coatings can have a reduced tendency to run, even when applied upon a vertical substrate. Surface gloss of the coatings can be readily adjusted. The writing surface of the coating can be projectable. The coatings can be hard. The coatings can be substantially impervious to organic solvents and/or inks. The coatings can have a low porosity. Surfaces of the coatings can have a low roughness. The coatings can be impact resistant. The coatings can be made scratch and abrasion resistant. The coatings can be relatively low cost. The coatings can have a high chemical resistance.

"Curing" as used herein, refers to a process of setting (e.g., by evaporation (drying) or cross-linking) a material to form a coating on a substrate. Curing can be performed by exposure to ambient conditions, radiation; or cross-linking (e.g., oxidative cross-linking).

"Solvent-based" as used herein refers to a mixture predominantly containing organic solvents. Such organic solvents may be used either in their anhydrous or wet form unless specified otherwise.

"Ambient conditions" as used herein refers to nominal, earth-bound conditions as they exist at sea level at a temperature of about 45-130° F.

"Effectively invisible" as used herein refers to a color difference Delta E (ΔE) of less than 20 as calculated according to the ASTM Test Method D2244 before and after a mark is erased by an eraser.

"Substantially invisible" as used herein refers to a color difference Delta E (ΔE) of less than 10 as calculated according to the ASTM Test Method D2244 before and after a mark is erased by an eraser.

"Alkyl" as used herein, refers to a saturated or unsaturated hydrocarbon containing 1-20 carbon atoms including both acyclic and cyclic structures (such as methyl, ethyl, propyl, isopropyl, butyl, iso-butyl, sec-butyl, pentyl, hexyl, cyclopropyl, cyclobutyl, cyclopentyl, cyclohexyl, propenyl, butenyl, cyclohexenyl and the like). A linking divalent alkyl group is referred to as an "alkylene" (such as ethylene, propylene and the like).

As used herein, "aryl" refers to monocyclic or polycyclic (e.g., having 2, 3 or 4 fused rings) aromatic hydrocarbons such as, phenyl, naphthyl, anthracenyl, phenanthrenyl, indanyl, indenyl, and the like. In some embodiments, aryl groups have from 6 to 20 carbon atoms, from 6 to 15 carbon atoms, or from 6 to 10 carbon atoms.

As used herein, "heteroaryl" refers to an aromatic heterocycle having at least one heteroatom ring atom such as sulfur, oxygen, or nitrogen. Heteroaryl groups include monocyclic and polycyclic (e.g., having 2, 3, or 4 fused rings) systems. Examples of heteroaryl groups include without limitation, pyridyl, furyl, quinolyl, indolyl, oxazolyl, triazolyl, tetrazolyl, and the like. In some embodiments, the heteroaryl group has from 1 to 20 carbon atoms (e.g., from 3 to 20 carbon atoms). In some embodiments, the heteroaryl group has 1 to 4 heteroatoms (e.g., 1 to 3, or 1 to 2 heteroatoms).

As used herein, "aralkyl" refers to alkyl substituted by aryl. An example aralkyl group is benzyl.

As used herein, "alkoxy" refers to an —O-alkyl group. Example alkoxy groups include methoxy, ethoxy, propoxy (e.g., n-propoxy and isopropoxy), t-butoxy, and the like.

As used herein, "oxyalkylene" refers to an —O-alkylene group.

As used herein, "alkoxylate" refers to an alkyl-C(O)O. Example alkoxylates include acetate, stearate and the like.

As used herein, "halo" includes fluoro, chloro, bromo, and iodo.

A "polyol" as used herein is a moiety that includes at least two hydroxyl (—OH) groups. The hydroxyl groups can be terminal and/or non-terminal. The hydroxyl groups can be primary hydroxyl groups.

A "polyurethane" as used herein is a polymeric or oligomeric material that includes a urethane linkage, [NHC(=O) O], in its backbone.

All publications, patent applications, patents, and other references mentioned herein are hereby incorporated by reference herein in their entirety.

It is to be further appreciated that certain features of the invention, which are, for clarity, described in the context of separate embodiments, can also be provided in combination in a single embodiment. Conversely, various features of the invention which are, for brevity, described in the context of a single embodiment, can also be provided separately or in any suitable subcombination.

The details of one or more implementations of the disclosure are set forth in the accompanying drawings, and in the description below. Other features, and advantages will be apparent from the description and drawings, and from the claims.

BRIEF DESCRIPTION OF DRAWINGS

Like reference symbols in various drawings indicate like elements.

DETAILED DESCRIPTION

Writable-Erasable Product

Figure 1:
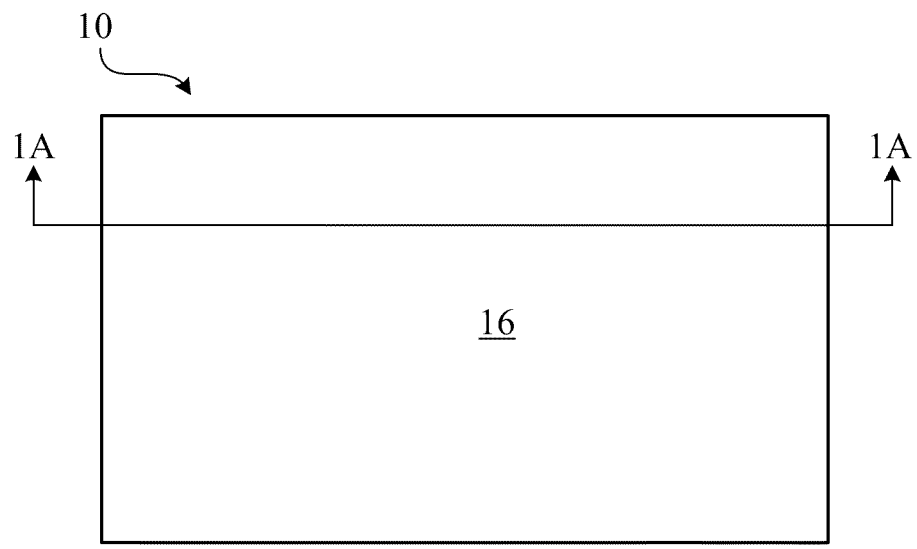
FIG. 1 is a top view of a writable-erasable product.
Figure 1A:
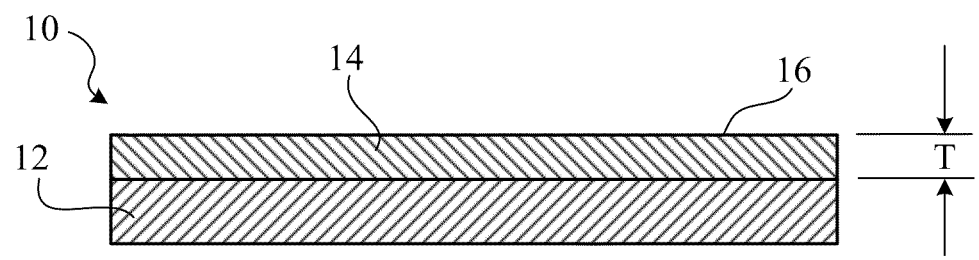
FIG. 1A is a cross-sectional view of the writable-erasable product of FIG. 1, along 1A-1A.

Referring to FIGS. 1 and 1A, a writable-erasable product 10 includes a substrate 12 and a coating 14 (e.g., a cured coating) extending upon the substrate 12. The cured coating 14 has a writable-erasable surface 16. When the writable-erasable surface 16 is marked with a marking material, the marking material can be erased from the writable-erasable surface to be effectively (e.g., substantially) invisible, resulting in little or no ghosting, even after prolonged normal use, for example, after about 10 cycles (e.g., after about 50 cycles, after about 100 cycles, after about 500 cycles, after about 1,000 cycles, after about 2,000 cycles, after about 3,000 cycles, after about 4,000 cycles, after about 5,000 cycles, after about 6,000 cycles, after about 7,000 cycles, after about 8,000 cycles, or after about 9,000 cycles) of writing and erasing at the same position. The visibility, or the lack thereof, of the erasing can be determined by measuring the color change (Delta E, ΔE) on the writable-erasable surface using a spectrophotometer (such as the SP-62 portable spectrophotometer available from X-Rite), after marking on the surface and erasing the marking. The color change is a composite of three variables, lightness (L*), red/green value (a*), and yellow/blue value (b*). The erasability characteristics of the writable erasable surface 16 can be defined in terms of the ΔE value. In some implementations, the ΔE for the writable-erasable surface 16 after 5,000 cycles (or even after 10,000 cycles) can be less than about 50, e.g., less than about 40, less than about 30, less than about 20, less than about 10, less than about 9, less than about 8, less than about 7, less than about 6, less than about 5, less than about 4, less than about 3, less than about 2, or less than about 1.

In some implementations, the ΔE for the writable-erasable surface 16 after 5,000 cycles (or even after 10,000 cycles) can be from about 0.1 to about 10.0, e.g., from about 0.1 to about 0.5, from about 0.5 to about 1.0, from about 1.0 to about 1.5, from about 1.5 to about 2.0, from about 2.0 to about 2.5, from about 2.5 to about 3.0, from about 3.0 to about 3.5, from about 3.5 to about 4.0, from about 4.0 to about 4.5, from about 4.5 to about 5.0, from about 5.0 to about 5.5, from about 5.5 to about 6.0, from about 6.0 to about 6.5, from about 6.5 to about 7.0, from about 7.0 to about 7.5, from about 7.5 to about 8.0, from about 8.0 to about 8.5, from about 8.5 to about 9.0, from about 9.0 to about 9.5, or from about 9.5 to about 10.0.

It is to be appreciated that the erasability characteristic may also be evaluated based on the differences in L* (ΔL*), without attribution to color differences. This evaluation can also be combined with the progressive abrasion of the coating on an abrader, such as the Taber abrader 4360. The abrasion of the coating can be performed similar to the ASTM Method D4060. In this instance, the erasability characteristic as a function of the abrasion can be determined by abrading the writable-erasable surface 16 for a certain number of cycles and then measuring the change in lightness (ΔL*) value after marking on the surface followed by erasing the marking. Typically, a substrate with a cured coating can be loaded on an abrader and abrasive wheels can be rotated on the writable-erasable surface 16 for a certain number of cycles (e.g., 50 cycles, 100 cycles, 150 cycles, 200 cycles, 500 cycles, or 1,000 cycles). After each abrasive cycle, a spectrophotometer (such as the SP-62 portable spectrophotometer available from X-Rite) can be used to measure the L* of the abraded area ($L^*_A$) and the writable-erasable surface 16 can be marked with a marking material (such as an Expo 1 or Expo 2, Blue or Black marker) and erased (such as with an Expo felt dry Eraser). A spectrophotometer (such as the SP-62 portable spectrophotometer available from X-Rite) can be used to measure the L* value of the erased area ($L^*_B$). The ΔL* can be determined from the difference of $L^*_A$ and $L^*_B$ values. In some implementations, the ΔL* value for the writable-erasable surface 16 after 1,000 cycles can be at least about 20, e.g., at least about 30, at least about 40, at least about 50, at least about 60, at least about 65, at least about 70, at least about 75, at least about 80, at least about 85, at least about 90, or at least about 99. In some other implementations, the ΔL* value for the writable-erasable surface 16 after 1,000 cycles can be at least about 65, e.g., at least about 67, at least about 69, at least about 71, at least about 73, at least about 75, at least about 77, at least about 79, at least about 81, at least about 83, at least about 85, at least about 87, at least about 89, or at least about 91. In yet other implementations, the ΔL* value for the writable-erasable surface 16 after 1,000 cycles can be from about 65 to about 70, from about 70 to about 75, from about 75 to about 80, from about 80 to about 85, from about 85 to about 90, from about 90 to about 95, or from about 95 to about 99.

The marking material can include a colorant (e.g., a pigment) and a solvent such as water, alcohol (such as alkoxy alcohol, ketonic alcohol), ketone, ester (such as acetate), mineral spirit, bio-based solvents (e.g., vegetable oil, corn oil, sunflower oil), or mixtures thereof. Bio-based solvents are alternatives to conventional organic solvents and can be obtained from agricultural products. Such solvents can provide lower volatile organic compounds in coatings and decreased environmental impact. The marking material can be selected from any of the industry standard dry-erase markers.

The materials that form the coating 14 can be applied to many different types of substrates, including porous (e.g., paper) and non-porous substrates (e.g., densified ceramics). The substrate 12 can be a flexible film or a rigid movable or immovable structure. Examples of the substrate include, but not limited to, a polymeric material (such as a polyester or a polyamide), a cellulosic material (such as paper), glass, wood, plastics (such as HDPE, LDPE, or an ABS-based material), a wall (such as a plaster or painted wall), a fiber board (such as a whiteboard in which the cured coating extends upon a fiber board), a particle board, (such as a chalkboard or blackboard), a gypsum board, densified ceramics, stone (such as granite), and a metal (such as aluminum or stainless steel). The substrate could be a newly built structure or even an old and worn out chalkboard, blackboard, or whiteboard. In some instances, the surface of the substrate can be cleaned by sanding the surface and priming the surface prior to application of the coating. In some instances, the surface can also be cleaned with a cleaning agent (e.g., acetone or a mild acid) in order to provide better adhesion of the coating to the surface.

The materials that form the coating 14, prior to the application on substrates, can have a pot life which is the period during which the materials must be applied on the substrate. In some implementations, the materials can have a pot life of from about 10 minutes to about 16 hours, for example, from about 30 minutes to about 12 hours, from about 60 minutes to about 8 hours, from about 1 hour to about 4 hours, or from about 1 hour to about 2 hours. In other implementations, the materials can have a pot life of greater than about 6 months, for example, about 12 months, about 18 months, about 24 months, about 30 months, or about 36 months.

The materials that form the coating 14, upon application to the substrates, typically cure under ambient conditions. While not intending to be bound by any theory, it is believed that cross-linking between polymeric chains can influence certain unique properties of coatings. In some optional implementations, the curing can be facilitated by ultra-violet (UV) light, thermal means, initiators, or electron-beam. The coating 14 can cure under ambient conditions in from about 4 hours to about a week, e.g., from about 4 hours to about 24 hours, from about 8 hours to about 20 hours, from about 12 hours to about 16 hours, from about 1 day to about 7 days, from about 2 days to about 6 days, or from about 3 days to about 5 days. The cured coating 14 can be generally stable and also emit little or no VOCs after curing. Curing under ambient conditions can reduce environmental impact and can make the materials safer to use.

The porosity of a coating can determine the amount of marking material that can be trapped in the coating. While not intending to be bound by any theory, it is believed that lower porosity of coatings can lead to better writable-erasable surfaces. In some implementations, the coating 14 can have a porosity of between about 1 percent and about 40 percent, e.g., between about 2 percent and about 35 percent, between about 2.5 percent and about 30 percent, or between about 3 percent and about 20 percent. In other implementations, the coating 14 can have a porosity of less than about 40 percent, e.g., less than about 35 percent, less than about 30 percent, less than about 25 percent, less than about 20 percent, less than about 15 percent, less than about 10 percent, less than about 5 percent, or even less than about 2.5 percent.

In some implementations, the coating can have a porosity of between about 2 percent and about 45 percent, e.g., between about 2.5 percent and about 35 percent or between about 3 percent and about 35 percent. In some specific implementations, the coating can have a porosity of about 3 percent, about 33 percent or about 34 percent.

The coating formulations can be prepared by standard techniques known to one skilled in the art. For example, during a grind stage, pre-determined amounts of the materials to be used in the formulation can be mixed at required speeds in high shear dispersers until the materials are homogeneously dispersed. The degree of dispersion of the materials and pigments can be determined with a Hegman gauge. The remaining materials, if any, can be introduced at a letdown stage to obtain the final formulation before being packaged. In two-component coating formulations, the two parts are mixed thoroughly and can be allowed to stand for a period of time before it can be applied on a substrate.

The coating formulation can be applied on a substrate 12 in a single coat or multiple coats using a roller, a spray (such as an aerosol spray), a brush or using other types of applicators. In some implementations, it can be painted using a foam roller in a single coat. In some implementations, the coating 14 can have a thickness, T (FIG. 1A), e.g., between about 0.001 inch and about 0.125 inch, e.g., between about 0.002 inch and about 0.1 inch, between about 0.004 inch and about 0.08 inch, between about 0.006 inch and about 0.06 inch, between about 0.008 inch and about 0.04 inch, or between about 0.01 inch and about 0.02 inch). In other implementations, the coating 14 can have a thickness of greater than about 0.005 inch, e.g., greater than about 0.0075 inch or greater than about 0.010 inch. While not intending to be bound by any theory, it is believed that providing an uniform, adequate coating thickness, T, reduces the likelihood of thin or uncoated substrate portions where marking material might penetrate.

In some implementations, the coating 14 can have a Taber abrasion value of less than about 150 mg/thousand cycles, e.g., less than about 100 mg/thousand cycles, less than about 75 mg/thousand cycles, less than about 50 mg/thousand cycles, less than about 35 mg/thousand cycles, less than about 25 mg/thousand cycles, less than about 15 mg/thousand cycles, less than about 10 mg/thousand cycles, less than about 5 mg/thousand cycles, less than about 2.5 mg/thousand cycles, less than about 1 mg/thousand cycles, or even less than about 0.5 mg/thousand cycles. Maintaining a low Taber abrasion value can provide long-lasting durability to the coating, reducing the incidence of thin spots, which could allow penetration of marking material through the coating and into the substrate.

In some implementations, the coating 14 can have a Sward hardness of greater than about 10, e.g., greater than about 15, greater than about 25, greater than about 50, greater than about 75, greater than about 100, greater than about 120, greater than about 150, or even greater than about 200. While not intending to be bound by theory, it is believed that maintaining a high Sward hardness provides long-lasting durability and scratch resistance to the coating. Marking material entrapped in scratches can be difficult to erase.

In some specific implementations, the coating 14 can have a Sward hardness of between about 10 and about 75, e.g., between about 15 and about 70 or between about 15 and about 55. In some specific implementations, the coating can have a Sward hardness of about 15, about 22 or about 25.

In some implementations, elongation at break for the coating material can be between about 5 percent and about 400 percent, e.g., between about 25 percent and about 200 percent, or between about 50 percent and about 150 percent. In other implementations, the elongation at break can be greater than about 10 percent, e.g., greater than about 25 percent, greater than about 50 percent, or even greater than about 100 percent. While not intending to be bound by theory, it is believed that maintaining high elongation at break provides long-lasting durability to the coating, and it allows the coating to be stressed without forming cracks. Cracks can trap marking materials, making erasure from surfaces difficult and hence decreasing the longevity of the writable-erasable products.

In some implementations, the sag resistance for the coating material can be at least about 3 mils, e.g., about 4 mils, about 5 mils, about 6 mils, about 7 mils, about 8 mils, about 9 mils, about 10 mils, about 12 mils, about 14 mils, about 16 mils, about 18 mils, about 20 mils, about 22 mils, or about 24 mils. In other implementations, the coating 14 can have a sag resistance of from about 4 mils to about 24 mils, e.g., from about 5 mils to about 20 mils, from about 6 mils to about 18 mils, from about 7 mils to about 16 mils, from about 8 mils to about 14 mils, from about 9 mils to about 12 mils, or from about 10 mils to about 12 mils.

In some implementations, the writable-erasable surface 16 can have an average surface roughness ($R_a$) of between about 0.5 nm and about 7,500 nm, e.g., between about 1 nm and about 6,000 nm, between about 2 nm and about 5,000 nm, between about 5 nm and about 2,500 nm, between about 10 nm and about 1,500 nm, between about 20 nm and about 1,000 nm or between about 25 nm and about 750 nm. In other implementations, the writable-erasable surface 16 can have an average surface roughness ($R_a$) of less than about 7,500 nm, e.g., less than about 5,000 nm, less than about 3,000 nm, less than about 2,000 nm, less than about 1,000 nm, less than about 500 nm, less than about 250 nm, less than about 200 nm, less than about 100 nm, or even less than about 50 nm.

In some specific implementations, the writable-erasable surface 16 can have an average surface roughness ($R_a$) of between about 75 nm and about 1,000 nm, e.g., between about 100 nm and about 500 nm or between about 150 nm and about 400 nm. In some specific implementations, the writable-erasable surface 16 can have an average surface roughness ($R_a$) of about 150 nm, about 300 nm or about 1,000 nm.

In some implementations, the writable-erasable surface 16 can have a maximum surface roughness ($R_m$) of less than about 10,000 nm, e.g., less than about 8,000 nm, less than about 6,500 nm, less than about 5,000 nm, less than about 3,500 nm, less than about 2,000 nm, less than about 1,000 nm, or less even than about 500 nm.

In some implementations, the writable-erasable surface 16 can have a flat finish (gloss below 15, measured at 85 degrees), an eggshell finish (gloss between about 5 and about 20, measured at 60 degrees), a satin finish (gloss between about 15 and about 35, measured at 60 degrees), a semi-gloss finish (gloss between about 30 and about 65, measured at 60 degrees), or gloss finish (gloss greater than about 65, measured at 60 degrees).

In some specific implementations, the writable-erasable surface 16 can have a 60 degree gloss of between about 45 and about 90, e.g., between about 50 and about 85. In other implementations, the writable-erasable surface 16 can have a 20 degree gloss of between about 10 and about 50, e.g., between about 20 and about 45. In still other implementations, the writable-erasable surface 16 can have a 85 degree gloss of between about 45 and about 90, e.g., between about 75 and about 90. In other specific implementations, the writable-erasable surface 16 can have a 20 degree gloss of about 12, about 23, or about 46; or a 60 degree gloss of about 52, about 66, or about 85; or a 85 degree gloss of about 64, about 78, or about 88.

Figure 2:
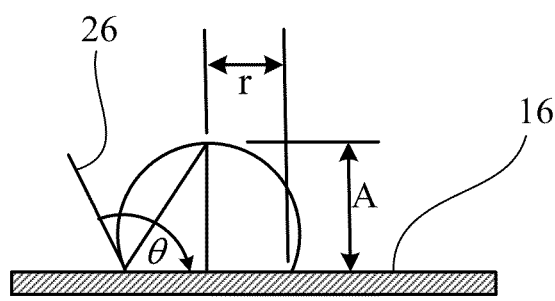
FIG. 2 is a cross-sectional view of a droplet of water on a coating and illustrates a method for determining contact angle.

In some implementations, to improve the writability and erasability of the surface 16 of the coating 14, precursor materials can be chosen so that the cured coating 14 has a surface that is relatively hydrophilic and not very hydrophobic. Referring to FIG. 2, hydrophobicity of the writable-erasable surface 16 is related to its wettability by a liquid, e.g., a water-based marking material. It is often desirable to quantify the hydrophobicity of the writable-erasable surface 16 by a contact angle. Generally, as described in ASTM D 5946-04, to measure contact angle, 0, for a liquid (such as water) on the writable-erasable surface 16, an angle is measured between the writable-erasable surface 16 and a tangent line 26 drawn to a droplet surface of the liquid at a three-phase point. Mathematically, θ is 2× arctan(A/r), where A is the height of the droplet image, and r is half width at the base. In some implementations, it can be desirable for the writable-erasable surface 16 to have contact angle, θ, measured using deionized water, of less than about 150 degrees, e.g., less than about 125 degrees, less than about 100 degrees, less than about 75 degrees or even less than about 50 degrees. In other implementations, it can be desirable for the writable-erasable surface 16 to have contact angle θ above about 35 degrees, e.g., above about 40 degrees, or above about 45 degrees.

In certain implementations, contact angle, θ, measured using deionized water, can be between about 30 degrees and about 90 degrees, e.g., between about 45 degrees and about 80 degrees, or between about 39 degrees and about 77 degrees. In some specific implementations, the contact angle can be about 40 degrees, for example, about 50 degrees, about 60 degrees, about 73 degrees, or about 77 degrees.

In some implementations, the writable-erasable surface 16 can have a surface tension of between about 30 dynes/cm and about 60 dynes/cm, e.g., between about 40 dynes/cm and about 60 dynes/cm. In some specific implementations, the writable-erasable surface 16 can have a surface tension of about 25 dynes/cm, about 30 dynes/cm, about 42 dynes/cm, about 44 dynes/cm or about 56 dynes/cm.

In general, the coating 14 can be formed by applying (e.g., rolling, painting, or spraying) a solution of the material in a solvent-based carrier that can have a sufficient viscosity such that the applied coating 14 does not run soon after it is applied or during its curing. At the same time, the solution viscosity should be sufficient to permit easy application. In some implementations, the applied solution can have a viscosity at 25° C. of between about 75 mPa·s and about 20,000 mPa·s, e.g., between about 200 mPa·s and about 15,000 mPa·s, between about 1,000 mPa·s and about 10,000 mPa·s, or between about 750 mPa·s and about 5,000 mPa·s.

Advantageously, when the writable-erasable surface 16 is marked with a marking material that includes a colorant and a solvent, the marking material can be erased from the writable-erasable surface to be effectively (e.g., substantially) invisible. The solvent includes one or more of water, alcohols (such as alkoxy alcohols, ketonic alcohols), ketones, esters (such as acetates), mineral spirits, or bio-based solvents (e.g., vegetable oil, corn oil, or sunflower oil). Mixtures of any of the noted solvents can also be used. For example, mixtures of two, three, four or more of the noted solvents may be used.

In some implementations, the marking material can be erased from the writable-erasable surface 16 to be effectively (e.g., substantially) invisible by wiping the marks with an eraser that includes a fibrous material. For example, the eraser can be in the form of a disposable wipe, a cloth, or a supported (e.g., wood, plastic) felt. The eraser can also include a solvent such as water, alcohols (e.g., alkoxy alcohols, ketonic alcohols), ketones, esters, (e.g., acetates), or mineral spirits. Mixtures of any two or more of these solvents can also be used.

Examples of alcohols that can be used in the marking material or the eraser include ethanol, n-propanol, iso-propanol, n-butanol, iso-butanol, benzyl alcohol, 2-(n-propoxy) ethanol, 2-(n-butoxy)ethanol and 3-(n-propoxy)ethanol.

Examples of ketones that can be used in the marking material or the eraser include acetone, methyl ethyl ketone and methyl n-butyl ketone.

Examples of esters that can be used in the marking material or the eraser include methyl acetate, ethyl acetate, n-butyl acetate and t-butyl acetate.

For testing, the coating 14 can be made by casting a material on a fluoropolymer substrate, and then curing the material so that it can have a dry thickness of about 0.002 inch. The cured sample can then be removed from the fluoropolymer substrate to provide the test specimen. Testing can be performed at 25° C. Elongation at break can be measured using ASTM method D-882; porosity can be measured using mercury porosimetry (suitable instruments available from Micromeritics, Norcross, Ga., e.g., Micromeritics Autopore IV 9500); surface roughness can be measured using atomic force microscopy (AFM) in tapping mode using ASME B46.1 (suitable instruments, e.g., WYKO NT8000, are available from Park Scientific); Taber abrasion resistance can be measured according to ASTM method D-4060 (wheel CS-17, 1 kg load) and Sward hardness can be measured according to ASTM method D-2134 (Sward Hardness Rocker Model C). The amount of VOCs can be determined using the EPA Method 24. Gloss can be measured using ASTM method D-523-89 (BYK Tri-Gloss Meter Cat. No. 4525). Contact angle can be measured with deionized water using the dynamic contact angle method (Angstroms Model FTA 200) using ASTM method D-5946-04. Sag resistance can be measured using ASTM method D4400 which can be performed by obtaining a draw-down and measuring visually by comparison with standard ASTM pictures. Surface tension can be measured using AccuDyne Marking Pens. Stormer Viscosity can be measured on a Brookfield Viscometer by ASTM method D-562 and reported in Kreb units (Ku).

Any writable-erasable product described herein can have any one or more of any of the attributes described herein. For example, the writable-erasable surface can have an average surface roughness ($R_a$) of less than about 7,500 nm, a maximum surface roughness ($R_m$) of less than about 7,500 nm, a 60 degree gloss of less than about 50 and a contact angle of less than about 100 degrees.

Any coatings described herein can have any one or more of any of the following attributes. For example, the coating can have a porosity of less than about 45 percent, an elongation at break of between about 25 percent and about 200 percent, and/or a Sward hardness of greater than about 3 and a Taber abrasion value of less than about 150 mg/thousand cycles.

Formulations

Solvent-based coatings utilize solvents to disperse or dissolve the resins and other ingredients to provide uniform dispersions or solutions. The use of solvent-based systems can provide a durable, high quality finish in many applications. Solvent-based coatings also display ease of application and present less restrictions to achieving desired properties in a formulation due to the range of solvents that can be chosen during formulation. Further, solvent-based coatings can be applied on a broader range of substrates.

The cured coating 14 having the writable-erasable surface 16 can be formed under ambient conditions from an uncured coating formulation. The coating formulations, in general, can include the materials described below. The formulations can include either a one-component system or a multi-component system (e.g., a two-component system). A one-component system, for example, consists of a coating formulation material packaged to be ready for use. A two-component system, for example, consists of two coating materials that are mixed, when desired, to obtain the final coating formulation prior to application on the substrate.

Polyurethanes

Polyurethanes can be obtained by the reaction of a diisocyanate or polyisocyanate with a diol or a polyol. Polyurethanes exhibit a wide range of hardness and flexibility depending on various factors including the nature of the isocyanate-containing substance and/or the hydroxyl-containing substance as well as the nature of curing. Polyurethane coatings could either be formulated as one-component or two-component coatings. Reactive polyurethane coatings typically involve using isocyanate and hydroxyl as the reactive groups during curing. See: The ICI Polyurethanes Book, George Woods. (John Wiley & Sons: New York, 1987), and Organic Coatings-Properties, Selection and Use U.S. Department of commerce, National Bureau of Standards: Washington D.C., Series 7; Feb. 1968, the complete disclosures of which are incorporated by reference herein. Polyurethane coatings have also been categorically assigned several ASTM designations (Types I-VI).

For example, the coating 14 described in FIG. 1 can be formed from one or more materials including one or more isocyanate (such as diisocyanante) and one or more materials including one or more hydroxyl, at least one of these materials can be in a solvent-based carrier, e.g., an organic solvent. In some implementations, the coating can be or includes a reaction product of a first component that includes an isocyanate and a second component that includes a hydroxyl containing compound (such as a polyol). Diisocyanates for use in polyurethane applications, in general, can be obtained by the reaction of amines with phosgene. Examples of organic diisocyanates include aliphatic, cycloaliphatic (alicyclic), and aromatic diisocyanates. e.g., methylene diisocyanate, tetramethylene diisocyanate, hexamethylene diisocyanate (HDI), octamethylene diisocyanate, decamethylene diisocyanate, 2-methylpentane-1,5-diisocyanate, toluene diisocyanate (TDI), diphenylmethane diisocyanate (MDI), m- and p-phenylene diisocyanates, 4-chloro-m-phenylene diisocyanate, bitolylene diisocyanate, cyclohexane diisocyanate (CHDI), bis-(isocyanatomethyl)cyclohexane (H6XDI), dicyclohexylmethane diisocyanate (H12MDI), dimer acid diisocyanate (DDI), trimethyl hexamethylene diisocyanate, lysine diisocyanate and its methyl ester, methyl cyclohexane diisocyanate, 1,5-napthalene diisocyanate, xylene diisocyanate, polyphenylene diisocyanates, isophorone diisocyanate (IPDI), hydrogenated methylene diphenyl isocyanate (HMDI), tetramethyl xylene diisocyanate (TMXDI), 4-t-butyl-m-phenylenediisocyanate, 4,4'-methylene bis(phenyl isocyanate), tolylene diisocyanate, 4-methoxy-m-phenylene diisocyanate, biphenylene diisocyanate, cumene-2,4-diisocyanate, 3,3'-dimethyl-4,4'-biphenylene diisocyanate, p,p'-diphenylene diisocyanate, or oligomers and homopolymers thereof, and mixtures thereof.

The monomeric diisocyanates may further be converted into oligomeric prepolymers of higher molecular weight by treatment with diols or triols. Such oligomeric prepolymers can also be used as a reaction component in the production of the polyurethane coating. Diisocyanates for use in polyurethane applications can be available from various commercial vendors under different trade names. Examples of commercial diisocyanates include, but are not limited to, diphenylmethane diisocyanate (MDI) containing ISONATE™, PAPI™, SPECTRIM™ (available from Dow chemical company); Desmodur® polyisocyanates and Bayhydur® (available from Bayer); Sovermol® (available from Cognis); Reafree® and Chempol® (both available from Cook Composite Polymers).

In some implementations, the percentage weight of homopolymer of aliphatic diisocyante in the total material formulation can be about 26%, e.g., about 27%, about 28%, about 29%, about 30%, about 31%, about 32%, about 33%, about 34%, or even about 35%. In some implementations, the percentage weight of homopolymer of aliphatic diisocyante in the total material formulation can be from about 20% to about 40%, e.g., from about 22% to about 38%, from about 24% to about 36%, from about 26% to about 34%, or from about 28% to about 32%.

The isocyanate containing material of the formulation can have a viscosity of at least about 40 Kreb Units (Ku), e.g., at least about 50 Ku, at least about 60 Ku, at least about 70 Ku, at least about 85 Ku, at least about 90 Ku, at least about 91 Ku, at least about 95 Ku, at least about 100 Ku, or at least about 105 Ku. In some implementations, the isocyanate containing material of the formulation can have a viscosity of from about 40 Ku to about 140 Ku, e.g., from about 60 Ku to about 105 Ku, from about 70 Ku to about 105 Ku, or from about 80 Ku to about 95 Ku. In some specific implementations, the isocyanate containing material of the formulation can have a viscosity of about 85 Ku, e.g., about 87 Ku, about 89 Ku, about 91 Ku, about 93 Ku, or about 95 Ku.

Epoxies

An epoxy coating formulation can be obtained by mixing an epoxy resin with a curing agent. The epoxy resins can include polyether chains that contain one or more epoxide units in their structure. Polyethers have the repeating oxyalkylene units: alkylene substituted by oxygen groups, e.g., ethyleneoxy (—[$CH_2$—$CH_2O$]—). In some implementations, the polyether chains can have additional functional groups such as hydroxyl (—OH). Curing of epoxy resins can lead to less amount of volatile products. Due to the unique properties of the epoxide ring structure, the curing agents can be either nucleophilic or electrophilic. Examples of nucleophilic agents include alcohols, phenols, amines, amino silanes, thiols, carboxylic acids, and acid anhydrides. Examples of electrophilic agents include aryl iodonium salts, aryl sulfonium salts, and latent acid catalysts (e.g., dibutyltin diacetate). In some implementations, these curing agents can contain one or more nucleophilic groups. The epoxy resins themselves can contain an aliphatic (such as cyclic or acyclic) or an aromatic backbone or a combination of both. In some optional implementations, the epoxy resins can contain other non-interfering chemical linkages (such as alkyl chains).

For example, the coating 14 described in FIG. 1 can be formed from an epoxy material and an hydroxyl-containing or amine-containing material, at least one of these materials can be in a solvent-based carrier. In some implementations, the material can be or includes a reaction product of a first component that includes an epoxide or oxirane material (such as an epoxy prepolymer) and a second component that includes an alcohol, an alkyl amine (such as a cyclic or acyclic alkyl amine), a polyol, a polyamine (such as isophoronediamine), a polyester polyamine, or an amido polyamine. Either or both of the two components can be in a solvent-based carrier. In such implementations, the epoxide or oxirane material can serve as a crosslinking material. In some implementations, an oxazolidine can be added to either of the two components to serve as an accelerator to accelerate the reaction between the two components. In some specific implementations, the epoxide material can be epichlorohydrin, glycidyl ether type (such as diglycidyl ether of bisphenol-A), oxirane modified fatty acid ester type, or oxirane modified ester type. In some specific implementations, the polyol material can be a polyester polyol, polyamine polyol, polyamide polyol, or amine adduct polyol. In some implementations, a formulation for preparing the epoxy coating can be formulated as either a one-component or a multi-component (e.g., two-component) formulation.

Acrylics

Polyacrylates (also known as acrylics) have the repeating ethylene units of the following formula: —[$CH_2$—CH(X)]—, where X can be —CN, —COOH, alkylOC(O)—, alkylNHC(O)—. An acrylic polymer can be added into a solvent-based carrier (such as those described herein) to form a solution, a dispersion, or an emulsion before forming the coating 14. The acrylic material suitable for preparing coating 14 can include dispersions of acrylic monomers (including functional acrylic monomers such as hydroxy acrylates) with a cross-linking catalyst; acrylic copolymers which are capable of self cross-linking; styrene-acrylic copolymers; or functionalized acrylic copolymers.

In some optional implementations, the material used to form the coating 14 can be or includes an acrylic material in a solvent-based carrier. In such implementations, the acrylic material can be methyl methacrylate based, butyl acrylate based, ethyl acrylate based, or their mixtures. In such implementations, a polycarbodiimide, an aziridine, or an imidazoline material can be added to the acrylic material to serve as an external cross-linking material. In such implementations, the acrylic coating can be formulated either as a one-component or a multi-component (e.g., two-component) formulation.

Vinylics

In general, vinyl polymers have the repeating unit of the following formula: —[$CX_1X_2$—$CX_3X_4$]—, where $X_1$, $X_2$, $X_3$ and $X_4$ can each independently be H, halo, alkyl, aryl, or heteroaryl. As an example, the copolymerization of the vinyl monomers such as polyvinyl chloride with ethylene provides varying flexibility and transparency required in many coatings. In some implementations, the vinylic material can have the repeating unit: —[$CH_2$—CH(X)]—, where X can be H, halo, alkyl, aryl, or heteroaryl. Polyvinyl chloride has the repeating units of ethylene substituted by chlorine: —[$CH_2$—CH(X)]—, where X is Cl. Polyethylene has the repeating units of ethylene: —[$CH_2$—$CH_2$]—. In some implementations, the vinylic material suitable for preparing coating 14 can be or includes a vinyl polymer resin material in a solvent-based carrier. In such implementations, the vinylic material can be polyvinyl chloride, polyvinyl chloride-ethylene copolymer, or a thio functionalized vinylic copolymer.

Alkyds

Alkyd resins are complex polyesters formed by the condensation of polyhydric alcohols which contain two or more reactive hydroxyl groups, with polybasic acids which contain two or more reactive carboxylic acid groups. Examples of polyhydric alcohols include glycerol, pentaerythritol, trimethylolethane, trimethylolpropane, and hexan-1,2,3-triol. Examples of polybasic acids include malonic, succinic, and glutaric acid.

In some implementations, the coating material can be or includes an alkyd material in a solvent-based carrier. In such implementations, the alkyd material can be castor oil, soybean oil, sunflower oil, soya oil, linseed oil, tall oil, vinyl toluene alkyd, urethane alkyd, styrenated alkyd, or their mixtures.

Hybrid Systems

Some or all of the formulation systems mentioned above may be combined together in a solvent-based carrier to form a hybrid system. An hybrid system typically is an admixture of two types of resins. The hybrid system can either be a hybrid polymer system in a homogeneous medium or a hybrid polymer system in a non-homogeneous medium (e.g., a hybrid dispersion). Hybrid systems can contain two classes of different polymers or resins which interact cooperatively to provide desired properties, possibly in a solvent-based carrier. In some implementations, the hybrid material in a solvent-based carrier can be part of a one-component or a two-component coating material. In such implementations, the hybrid material can be a combination of polyurethane/acrylic, epoxy/acrylic, alkyd/acrylic, polyvinyl chloride (PVC)/alkyd, PVC/epoxy, or PVC/polyurethane. In such implementations, an external cross-linker such as a polycarbodiimide, an aziridine, or an imidazoline can be also added to the hybrid system.

Polyols

In general, a polyol used to form the coating 14 can be a compound containing two or more hydroxyl groups, such as an acrylic polyol, a polyoxyalkylene polyol, a polyester polyol, a polyamide polyol, a polyepoxy polyol, a polyvinyl polyol, a polyalkyd polyol, or a polyurethane polyol. A polyol, in general, can be reacted with the reactive groups such as isocyanates, epoxides and other such reactive groups to produce the coatings.

Acrylic polyols can be typically obtained by polymerization (e.g., by a free-radical mediated polymerization) of hydroxyacrylates, optionally in the presence of a vinyl monomer (e.g., styrene). Examples of hydroxyacrylates include butanediol monoacrylate (BDMA), 2-hydroxyethyl acrylate (HEA), 2-hydroxypropyl acrylate (HPA), hydroxybutyl acrylate, and polycaprolactone modified hydroxyethyl hexylacrylate. In some implementations, the percentage weight of an acrylic polyol in the total coating formulation can be at least about 12%, e.g., at least about 14%, at least about 15%, at least about 16%, at least about 17%, or even at least about 18%. In some implementations, the percentage weight of an acrylic polyol in the total material formulation can be from about 10% to about 20%, e.g., from about 11% to about 19%, from about 12% to about 18%, from about 13% to about 17%, or from about 14% to about 16%.

A polyoxyalkylene diol is an example of another polyol that can be used to produce the coatings. In some implementations, the polyoxyalkylene diols can have a number average molecular weight of from about 200 to about 3,000, e.g., from about 500 to about 2,000, as determined using narrow disperse polyethylene glycol standards. Specific examples of polyoxyalkylene diols include polyethyleneether glycol, polypropyleneether glycol, polybutyleneether glycol, polytetramethyleneether glycol, and copolymers thereof. Mixtures of any of the polyoxyalkylene diols can also be used.

Polyesters having terminal hydroxyl groups are another example of a polyol that can be used to produce the coatings. Such polyester diols can be prepared by the condensation of a diol with a dicarboxylic acid or an equivalent thereof (e.g., an acid halide or an anhydride). Examples of suitable diols include ethylene glycol, 1,2-propanediol, 1,3-propanediol, 1,3-butanediol, 1,4-butanediol, 1,2-pentanediol, 1,5-pentanediol, 1,3-hexanediol, 1,6-hexanediol, diethylene glycol, dipropylene glycol, triethylene glycol, tetraethylene glycol, or mixtures of these diols. Examples of suitable acids include oxalic, malonic, succinic, glutaric, adipic, pimelic, suberic, azelaic, terephthalic, sebacic, malic, phthalic, cylohexanedicarboxylic or mixtures of these acids. When preparing these polyester diols, generally an excess of the diol over dicarboxylic acid is used.

A polyurethane diol, having terminal hydroxyl groups is yet another example of a polyol that can be used to produce the coatings. The polyurethane diols can include units of polyalkylene, poly(oxyalkylene), polyester, polyamide, polycarbonate, polysulfide, polyacrylate, polymethacrylate, or mixtures of any of these polymers. In some implementations, the polyurethane diols have a number average molecular weight of from about 200 to 3,000, e.g., from about 500 to about 2,000, as determined using narrow disperse polyethylene glycol standards. Polyurethane diols can be advantageously utilized to provide particularly wear and scratch resistant coatings. The polyurethane having terminal hydroxy groups can be prepared by a reaction of any one or more of the polyols discussed above and an organic diisocyanate to provide a isocyanate terminated prepolymer, followed by reaction of the prepolymer with a polyhydric alcohol containing 2-6 hydroxyl groups. Some polyurethane diols are commercially available from Sigma-Aldrich Chemicals or King Industries.

In some implementations, the isocyanate terminated perpolymer can be obtained by reacting a diol with a diisocyanate utilizing a molar ratio of about 1:2, respectively, in the presence of an activator (or accelerator) such as oxazolidine or an organotin compound (e.g., dibutyltin dilaurate or dibutyltin dioctoate). The reaction can be allowed to proceed at a temperature of from about 60° C. to about 180° C. for a period of from about 4 hours to about 24 hours to provide the isocyanate terminated prepolymer.

The isocyanate terminated urethane prepolymer can then be reacted, e.g., from about 60° C. to about 110° C. for about 1 hour to about 10 hours, with a monomeric, polyhydric alcohol containing 2-6 hydroxyl groups in a molar ratio of 1:2, respectively. Examples of monomeric, polyhydric alcohols that can be used include 1,4-cyclohexane dimethanol, 1,4-butanediol, mannitol, trimethylol propane, trimethylol ethane, 1,1-cyclohexane dimethanol, hydrogenated bisphenol A, cyclohexane diol, neopentyl glycol, trimethylpentanediol, pentaerythritol, and trimethylhexanediol. The result of treating the isocyanate terminated urethane prepolymer with the one or more alcohols is a polyurethane diol having 2-10 terminal hydroxy groups and no isocyanates groups.

Polyurethane diols can also be made by reacting organic carbonates with amines.

In some implementations in which a polyurethane diol and an alkoxyalkylamino material are used to make the coating, the molar ratio of polyurethane diol to the alkoxyalkylamino material can range from about 10:1 to about 1:1, e.g., from about 5:1 to about 1:1.

Examples of commercial polyols include, but are not limited to, Desmophen® (available from Bayer), Macrynal® (available from Cytec Industries) and Arolon® (available from Reichold).

In some optional implementations, the coating material can be or includes a reaction product of a first component that includes an alkoxyalkylamino material in a solvent-based carrier and a second component that includes a polyol in a solvent-based carrier. In such implementations, the alkoxyalkylamino material can serve as a cross-linking material.

In yet other optional implementations, the coating materials can include rosin phenolic resin, epoxy ester resin, fluorine based resins (such as fluorine modified acrylic, fluorine modified epoxy, fluorine modified alkyd, or fluorine modified polyurethane), siloxane based resins (such as hydroxy-functional polydimethylsiloxane e.g., hydroxyalkyl polydimethylsiloxane), silica based resins (such as silica modified acrylic, silica modified epoxy, silica modified alkyd, or silica modified polyurethane).

Solvents

The coating 14 can be formed from a material in a solvent-based carrier, e.g., an organic solvent. While not intending to be bound by theory, it is believed that solvents can be effective as a dispersive vehicle for the pigments and resins in a coating formulation prior to curing. During the application of the formulation, they aid in achieving an appropriate viscosity of the formulation. However, after the coating has been cured, it can be expected that there is no residual solvent. The solvents can include 2-butoxyethanol, ethylene glycol, ethyl benzene, xylenes, methyl amyl ketone, isopropyl alcohol, propylene glycol monomethyl ether, ethylene glycol monobutyl ether, butanol, paraffins, alkanes, polypropylene glycol, Stoddard solvent, toluene, ethoxylated alkylphenol, 1-methyl-2-pyrrolidinone, or 1-ethylpyrrolidin-2-one. In some implementations, the solvent can be or includes hydrocarbons (such as saturated hydrocarbons and unsaturated hydrocarbons), alcohols (such as alkoxy alcohols, ketonic alcohols), ketones, esters (such as acetates), glycol ethers, and glycol ether esters. Examples of hydrocarbons include toluene, xylene, naphtha (petroleum), petroleum distillates, ethyl benzene, trimethyl benzenes, and fractions of hydrocarbon mixtures obtained from petroleum refineries. Mixtures of any two or more of these solvents may also be utilized. Examples of alcohols include ethanol, n-propanol, iso-propanol, n-butanol, iso-butanol, benzyl alcohol, 2-(n-propoxy)ethanol, 2-(n-butoxy) ethanol, 3-(n-propoxy)ethanol, and 2-phenoxyethanol. Mixtures of any two or more of these solvents may also be utilized.

Examples of ketones include acetone, methyl ethyl ketone, methyl n-propyl ketone, methyl n-butyl ketone, and methyl isoamyl ketone. Mixtures of any two or more of these solvents may also be utilized.

Examples of esters include ethyl propanoate, ethyl butanoate, ethyl glycolate, propyl glycolate, butyl glycolate, and isoamyl glycolate, methyl acetate, ethyl acetate, n-butyl acetate, isoamyl acetate, and t-butyl acetate. Mixtures of any two or more of these solvents may also be utilized.

Other Modifying Agents in the Formulations

Accelerators are agents that speed up the curing process. Accelerators that can be used in the formulation include dibutyltin dialkanoate (e.g., dibutyltin dialaurate, dibutyltin dioctoate), and oxazolidine. Acid promoters are also agents that speed up the curing process. Acid promoters include aryl, alkyl, and aralkyl sulfonic acids; aryl, alkyl, and aralkyl phosphoric and phosphonic acids; aryl, alkyl, and aralkyl acid pyrophosphates; carboxylic acids; sulfonimides; mineral acids and mixtures thereof. Examples of sulfonic acids include benzenesulfonic acid, para-toluenesulfonic acid, dodecylbenzenesulfonic acid, and naphthalenesulfonic acid. Examples of aryl, alkyl, and aralkyl phosphates and pyrophosphates include phenyl, para-tolyl, methyl ethyl, benzyl, diphenyl, di-para-tolyl, di-methyl, di-ethyl, di-benzyl, phenyl-para-tolyl, methyl-ethyl, phenyl-benzyl phosphates and pyrophosphates. Examples of carboxylic acids include citric acid, benzoic acid, formic acid, acetic acid, propionic acid, butyric acid, dicarboxylic acids such as oxalic acid, and fluorinated acids such as trifluoroacetic acid. Examples of sulfonimides include dibenzene sulfonimide, di-para-toluene sulfonimide, methyl-para-toluene sulfonimide, and dimethyl sulfonamide. Examples of mineral acids include phosphoric acid, nitric acid, sulfuric acid and hydrochloric acid. In some implementations, phosphoric acid, citric acid or a combination thereof can be utilized as an acid promoter.

Surface additives can modify the surface characteristics (such as surface tension properties, substrate wetting, gloss, feel, and slip) of the writable-erasable surface 16. Examples of surface additives can include modified polydimethyl siloxanes and polytetrafluoroethylene. The curable compositions can also contain other optional ingredients such as fillers, surfactants, light stabilizers, pigments, opacifying agents, defoaming agent, surface gloss-modifying agent, biocides, viscosity-modifying agent, dispersing agents, reactive diluents, extender pigments, inhibitors for corrosion or efflorescence, flame retardants, intumescent agents, thermal agents for energy efficiency, additives for protection from UV and/or IR, self-cleaning agents, perfumes, or odor sustaining agents.

Several commercial suitable light stabilizers are available from CIBA Specialty Chemicals under the trade names TINUVIN® (benzotriazole, triazine, or hindered amine based) and CHIMASSORB® (benzophenone based).

Wetting agents can modify the viscosity characteristics of the coating formulations. Examples of wetting agents can include silicone free family of agents, Metolat® available from Munzing Chemie GmbH.

Examples of opacifying agents can include zinc oxide, titanium dioxide, silicon dioxide, Kaolin clay, e.g., high whiteness Kaolin clay, or mixtures thereof.

Defoaming agents can release the trapped air in the coatings and can enhance the surface smoothness. Examples of defoaming agents can include polyethylene glycols, or silicone surfactants, e.g., polyether modified polydimethyl siloxane. Defoaming agents such as the BYK family of agents are available from BYK-Chemie GmbH.

Examples of viscosity modifying agents include polyurethanes, or a commercial acrylic copolymer, TAFIGEL®, available from Munzing Chemie GmbH.

Certain implementations are further described in the following examples, which are not intended to limit the scope of the disclosure.

EXAMPLES

Example 1

First Component: During the grind stage, to the pot were added, in order and in the ranges of weight % listed in Table 1: ethyl benzene, n-butyl acetate, xylene, acrylic polyol, Stoddard solvent, butylglycolate, 2-butoxyethanol, and methyl iso-amyl ketone. The contents were then mixed at slow speeds until fully dispersed. The speed was maintained at no more than 100-200 rpm. Titanium dioxide, aluminum hydroxide, amorphous silica and water were added to the mixture in the pot, while increasing the speed to achieve a good vortex. Final RPM settings were between 2,000-3,000 rpm. The speed was adjusted until maximum shear was obtained with minimal integration of air and mixed for 10-15 minutes, or a Hegman of 5-6. After ascertaining that there were no chunks, crystalline silica was added while increasing speed to achieve sufficient vortex. A sufficient RPM was maintained to get the temperature in the pot up to 95-110° F. within 10-15 minutes. The grind speed was maintained for additional five minutes then decreased by 25-35% to allow the heat to dissipate. Hegman at this point was at least a 7. Once Hegman was achieved, mixing speed was reduced until the pot was just mixing the raw materials and continued for 30 minutes.

During the letdown stage, ethyl benzene, n-butyl acetate, xylene, and acrylic polyol were added to the grind mixture. After less than 5-10 minutes, dibutyltin dilaurate, methyl iso-amyl ketone, and n-butyl acetete were added to the pot. The speed was maintained to mix the material. After 5-10 minutes, xylene and 2-phenoxyethanol were added while maintaining speed to mix in material. After 5-10 minutes propionic acid was added while maintaining mixing speed. After 5-10 minutes a mixture of crystal violet, methyl iso-amyl ketone, and n-butyl acetate was added while mixing and maintaining speed (crystal violet has a tendency to adhere to the shaft or sidewalls of the pot; scrapping the walls helped color uniformity). After 30 minutes the product was packaged.

Second Component: The homopolymer hexamethylene diisocyanate and hexamethylene-1,6-diisocyanate mixture was the second part of the final product. No mixing was required for these materials.

Combining the First and Second Components: The first and second components were combined, when desired, to obtain the final coating formulation. The combination had a pot life of a maximum of about 1 hour during which time the application was completed. The composition of the formulation is described in the Table 1 under Example 1. The typical properties of the coating are presented in Table 2.

Example 2

The procedure described in Example 1 was followed with attention to the fact that times for grinding were different. However, the total time needed for grind stage was not more than 2 hours. Additionally, the times for letdown were different. The total mixing time for letdown stage procedure was not more than 2-3 hours. The weight percentage ranges of the components in the final composition mixture are shown under Example 2 of Table 1.

Example 3

The procedure described in Example 1 can be followed with attention to the fact that times for grinding will vary. However, the total time needed for grind stage should not be more than 2 hours. Additionally, the times for letdown will vary. The total mixing time for letdown stage procedure should not be more than 2-3 hours. The weight percentage ranges of the components in the final composition mixture are shown under Example 3 of Table 1.

TABLE 1

Composition described in Examples 1-3

| Component | Weight percent in total formula | | |
|---|---|---|---|
| | Example 1 | Example 2 | Example 3 |
| Homopolymer of Hexamethylene diisocyanate | 32 | 23-28 | 28-34 |
| Titanium dioxide | 17 | 17-21 | 16-18 |
| n-Butyl acetate | 16 | 11-15 | 14-18 |
| Acrylic polyol | 13 | 13-15 | 12-14 |
| Xylenes | 7 | 1-5 | 6-8 |
| Methyl isoamyl ketone | 3 | 0.01-0.03 | 1-5 |
| Water | 3 | 6-8 | 2-4 |
| Silica, amorphous | 2 | 1-3 | 1-3 |
| Aluminum hydroxide | 2 | 1-3 | 1-3 |
| Ethyl benzene | 2 | 0.47-0.53 | 1-3 |
| Stoddard solvent | 1 | 0.5-2 | 0.5-2 |
| Hexamethylene diisocyanate | 0.19 | 0.14-0.17 | 0.21-0.22 |
| Ethylene glycol monophenyl ether | 0.09 | — | — |
| Butyl glycolate | 0.04 | 0.02-0.06 | 0.02-0.06 |
| Dibutyltin dilaurate | 0.01 | 0.02-0.05 | 0.005-0.02 |
| 2-Butoxyethanol | 0.01 | 0.005-0.02 | 0.005-0.02 |
| Silica, crystalline | 0.01 | 0.005-0.02 | 0.005-0.02 |
| C.I. Basic violet 1 | 0.0003 | — | 0.0004-0.0005 |

TABLE 2

Typical properties of the coating formulation

| Test Description | Example 1 |
|---|---|
| Porosity, % | 30 |
| Surface roughness, $R_a$ (nm) | 2612 |
| Sward hardness, # of rocks | 23 |
| Gloss | |
| 20 Degree | 47.1 |
| 60 Degree | 84.7 |
| 85 Degree | 86.8 |
| Contact angle, degrees (with D.I. water) | 65.00 |
| Surface tension, dynes/cm | 30 |

Example 4

The components described in the Table 3 below can be mixed, following a procedure similar to that described in Example 1, to obtain an epoxy based formulation containing the components having the weight percentage ranges indicated in the table. This formulation could be used either as a one-component system or as part of a two-component system.

TABLE 3

| Description | range % by wt on total formula |
|---|---|
| Oxirane-modified fatty acid ester | 17-20 |
| Stoddard solvent | 0.10-0.14 |
| Butylglycolate | 0.005-0.02 |
| 2-Butoxyethanol | 0.001-0.006 |
| Alkylarylalkoxylate | 0.02-0.13 |
| Ester/styrene maleic anhydride copolymer | 0.01-0.10 |
| Ethylene glycol | 0.01-0.03 |
| 2,4,7,9-Tetramethyl-5-decyne-4,7-diol | 0.01-0.03 |
| Ethyl benzene | 0.04-0.07 |
| Xylene, mixed isomers, pure | 0.4-0.6 |
| Titanium dioxide | 13-15 |
| Aluminum hydroxide | 1-3 |
| Amorphous silica | 1-3 |
| Water | 4-6 |

TABLE 3-continued

| Description | range % by wt on total formula |
|---|---|
| Propylene glycol monomethyl ether | 1-3 |
| Methyl amyl ketone | 5-7 |
| Isopropyl alcohol | 3-6 |
| High acid value polyester | 20-23 |
| Ethylene glycol monobutyl ether | 4-6 |
| Isopropyl alcohol | 4-6 |

Example 5

The components described in the Table 4 below can be mixed, following a procedure similar to that described in Example 1, to obtain an alkyd based formulation containing the components having the weight percentage ranges indicated in the table. This formulation could be used either as a one-component system or as part of a two-component system.

TABLE 4

| Description | Range % by wt on total formula |
|---|---|
| Ethyl benzene | 0.19-0.40 |
| Xylene | 0.85-2.8 |
| Alkyd resin | 39-45 |
| Stoddard solvent | 7-25 |
| Crystalline silica | 0.20-0.40 |
| Iso-butanol | 0.15-0.25 |
| Titanium dioxide | 25-34 |
| Aluminum hydroxide | 0.01-3 |
| Amorphous silica | 0.01-5 |
| Water | 6-16 |
| Methyl ethyl ketoxime | 0.60-0.80 |
| Cobalt neodecanoate | 0.05-2 |
| Neo c9-13 acid, cobalt salts | 0.05-2 |
| Diethylene glycol methyl ether | 0.005-2 |
| Neodymium 2-ethylhexanoate | 1-4 |
| Diethylene glycol butyl ether | 0.10-0.30 |
| 2,2-bipyridyl | 0.08-1.5 |
| PG monomethyl ether | 0.10-0.30 |
| DPG monomethyl ether | 0.005-2 |
| Aluminum salt | 2.2-2.5 |

Example 6

The components described in the Table 5 below can be mixed, following a procedure similar to that described in Example 1, to obtain an acrylic based formulation containing the components having the weight percentage ranges indicated in the table.

TABLE 5

| Description | Range % by wt on total formula |
|---|---|
| Acrylic polymer(s) | 26-30 |
| Methyl amyl ketone | 8.5-9.5 |
| Stoddard solvent | 0.30-0.70 |
| Butylglycolate | 0.04-0.07 |
| 2-butoxyethanol | 0.01-0.02 |
| Methyl amyl ketone | 1-4 |
| N-butyl acetate | 1-4 |
| Titanium dioxide | 21-27 |
| Aluminum hydroxide | 0.01-10 |
| Amorphous silica | 0.01-3 |
| Water | 6-10 |
| Dibutyltin dilaurate | 0.01-0.04 |
| Methyl amyl ketone | 0.05-2 |

TABLE 5-continued

| Description | Range % by wt on total formula |
|---|---|
| N-butyl acetate | 0.05-2 |
| Xylene | 0.20-0.50 |
| 2-phenoxyethanol | 0.09-0.12 |
| Homopolymer hexamethylene diisocyanate | 46-77 |
| N-butyl acetate | 7-16 |
| Xylene | 4-11 |
| Ethyl benzene | 0.05-2.5 |
| Hexamethylen-1,6 diisocyanate | 0.03-0.50 |

Example 7

The components described in the Table 6 below can be mixed, following a procedure similar to that described in Example 1, to obtain an acrylic based formulation containing the components having the weight percentage ranges indicated in the table.

TABLE 6

| Description | Range % by wt on total formula |
|---|---|
| Vinylic acrylic polymer(s) | 26-30 |
| Methyl amyl ketone | 8.5-9.5 |
| Stoddard solvent | 0.30-0.70 |
| Butylglycolate | 0.04-0.07 |
| 2-butoxyethanol | 0.01-0.02 |
| Methyl amyl ketone | 1-4 |
| N-butyl acetate | 1-4 |
| Titanium dioxide | 21-27 |
| Aluminum hydroxide | 0.01-10 |
| Amorphous silica | 0.01-3 |
| Water | 6-10 |
| Dibutyltin dilaurate | 0.01-0.04 |
| Methyl amyl ketone | 0.05-2 |
| N-butyl acetate | 0.05-2 |
| Xylene | 0.20-0.50 |
| 2-phenoxyethanol | 0.09-0.12 |
| Homopolymer hexamethylene diisocyanate | 46-77 |
| N-butyl acetate | 7-16 |
| Xylene | 4-11 |
| Ethyl benzene | 0.05-2.5 |
| Hexamethylen-1,6 diisocyanate | 0.03-0.50 |

Example 8

Quantitative Determination of the Erasable Characteristics of the Writable-Erasable Surface The color stimulus, which is the radiation from the colored object that produces the perception of that color, was measured. Color perception is affected not only by the spectral make up of the object, but also the light source under which it is viewed. If the spectral distribution of the light source and the relative spectral reflectance of the object are known, then the spectral composition reaching the eye of an observer with normal vision from the object illuminated by that source can be calculated. The Commission Internationale de L'Eclairage (CIE) has set up procedures for calculation of the color differences in a CIELAB color space.

The formulation in Example 1 was coated over a piece of dry wall. The markings were made using red, blue and green Expo 1 markers followed by erasing with the Quartet Ghost Duster® eraser. The X-Rite Sp-62 Spectrophotometer was used to take the color readings and to calculate $L^*$, $a^*$, and $b^*$ values automatically. The values were then recorded. The changes were calculated according to ASTM Test Method D2244, as differences in the $L^*$, $a^*$, and $b^*$ values, where the direction of the color difference is described by the magnitude and the algebraic signs of the components, $\Delta L^*$, $\Delta a^*$, $\Delta b^*$. The values were then calculated as follows:

$$\Delta L^* = L^*_1 - L^*_0 \quad (1)$$

$$\Delta a^* = a^*_1 - a^*_0 \quad (2)$$

$$\Delta b^* = b^*_1 - b^*_0 \quad (3)$$

where $L^*_0$, $a^*_0$, $b^*_0$ refers to the reference, and $L^*_1$, $a^*_1$, $b^*_i$, refers to the test specimen. Table 7 shows the magnitude and direction of each color value and what color change occurs.

Table 7. Meanings of Color Values

TABLE 7

Meanings of Color Values

| Direction | Color Change Value | Result |
|---|---|---|
| + | L* | Lighter |
| − | L* | Darker |
| + | A* | Redder (less green) |
| − | A* | Green (less red) |
| + | B* | Yellow (less blue) |
| − | B* | Bluer (less yellow) |

By choosing one sample to be the reference point, the change in color from this reference point is called the color difference ($\Delta E$), which is calculated from the equation:

$$\Delta E = [(\Delta L^*)^2 + (\Delta a^*)^2 + (\Delta b^*)^2]^{1/2} \quad (4)$$

The measured color difference ($\Delta E$) after certain number of cycles of writing and erasing, for the writable-erasable surface of the cured coating obtained from the formulation described in Example 1, are tabulated in Table 8.

TABLE 8

| Cycle | $\Delta L^*$ | $\Delta a^*$ | $\Delta b^*$ | $\Delta E$ |
|---|---|---|---|---|
| 0 | 93.38 | −0.90 | −0.01 | 0.0 |
| 500 | 93.15 | −0.93 | −0.03 | 0.23 |
| 1000 | 92.61 | −1.13 | 0.79 | 1.14 |
| 1500 | 92.03 | −1.35 | 1.27 | 1.92 |
| 2000 | 90.81 | −1.61 | 1.72 | 3.17 |
| 2500 | 91.16 | −1.67 | 1.75 | 2.94 |
| 3000 | 90.94 | −1.77 | 1.59 | 3.04 |
| 3500 | 91.63 | −1.69 | 1.45 | 2.41 |
| 4000 | 90.09 | −2.37 | 1.84 | 4.05 |
| 4500 | 90.97 | −1.92 | 1.63 | 3.08 |
| 5000 | 89.74 | −2.22 | 2.12 | 4.42 |
| 5500 | 90.37 | −2.19 | 1.96 | 3.82 |
| 6000 | 90.45 | −2.24 | 1.92 | 3.76 |
| 6500 | 88.84 | −2.31 | 2.46 | 5.36 |
| 7000 | 88.78 | −1.83 | 2.65 | 5.40 |
| 7500 | 89.84 | −2.19 | 2.48 | 4.52 |
| 8000 | 89.25 | −2.06 | 2.69 | 5.07 |
| 8500 | 89.28 | −2.14 | 2.55 | 4.99 |
| 9000 | 90.14 | −2.44 | 2.09 | 4.16 |
| 9500 | 88.44 | −2.17 | 3.01 | 5.92 |
| 10000 | 89.55 | −2.06 | 2.86 | 4.92 |

Example 9

Determination of Erasable Characteristics of a Writable-Erasable Surface

The nature of visual change (erasable characteristics) on the writable-erasable surface can be evaluated by the visual change perceived after the surface has been marked followed by erasing the marking. It can be characterized by the leave behind which can be determined after 1 or 2 passes by the eraser to erase the marking: the markings may seem to stick to the surface and they might erase as in streaks or might be spotty. The quality of the surface can also be measured by the dirtiness which can be determined after one pass with the eraser over the marked area, a faint to dark cloud might be left from the eraser, like smearing of the marking due to the eraser. Both "leave behind" and "dirtiness" can be measured on a scale of zero to ten based on the degree to which the marking material can be removed from the surface. The lower number indicates a better surface performance.

Example 10

ΔL*—Value Determination

An aluminum sheet was primed with one coat of Kilz Premium primer (available from Masterchem Industries) followed by application of one coat of the coating formulation (obtained by mixing the first and second components described in Example 1) applied with a 8 mil box drawdown. The coated sheet was then allowed to cure for 12 days. The sheets with the cured coating were mounted on a Taber abrader 4360 instrument (available from Taber Industries), and the writable-erasable surface is abraded with CS-10 abrasion wheels (a medium softness wheel type) using 250 gram weights on the balancing arm. The wheels were cleaned every 500 cycles using a sand cleaning paper (supplied by Taber Industries). The relative humidity was 60%, the ambient temperature was 70° F. at the time of testing. The writable-erasable surface was sampled after 0, 100, 200, 500 and 1000 cycles. The L-value (L*) was measured with the X-Rite Sp-62 Spectrophotometer at each sample point (0, 100, 200, 500 and 1000 cycles) and Expo 1 and Expo 2 blue and black markers were applied to the abraded area. The marking was erased with an Expo felt dry eraser and then the L-value (L*) was again measured. The change in lightness, ΔL* value (See Table 9), from these two measurements represents the amount of marker remaining over the abraded area that could not be removed.

TABLE 9

| | ΔL* | | | | |
|---|---|---|---|---|---|
| | Expo 1 | | Expo 2 | | Average |
| No. of cycles | Black | Blue | Black | Blue | ΔL* |
| 0 | 94.56 | 94.56 | 94.56 | 94.56 | 94.56 |
| 50 | 90.04 | 89.99 | 83.48 | 90.86 | 88.59 |
| 100 | 88.34 | 88.53 | 79.87 | 88.52 | 86.32 |
| 150 | 84.81 | 88.56 | 76.96 | 88.96 | 84.82 |
| 200 | 81.56 | 86.61 | 77.90 | 86.14 | 83.05 |
| 500 | 85.94 | 89.40 | 67.17 | 78.68 | 80.30 |
| 1000 | 86.56 | 89.62 | 71.58 | 89.23 | 84.25 |

Example 11

Application of the Coating

The application is performed in a clean, dustless environment. Prior to installation, the ambient temperature within the application site is maintained at not less than 45° F. for a minimum of 24 hours and proper ventilation of application areas is ascertained to minimize odors in vicinity of application. The surface of the substrate to be painted on is primed, using a non-tinted PVA or vinyl acrylic interior latex primer, until the color of the existing surface does not show through. The primer is allowed to dry completely according to manufacturer's recommendation. The surface is painted in approximately 2 foot wide sections by working from one end to the other. Each section is completed before painting the next section. A wet edge is maintained to avoid lap marks. A single coat is applied using foam roller covers. The equipment is cleaned with acetone or denatured alcohol. The coating is typically allowed to cure for 1 week, at room temperature, to form the writable-erasable surface.

The writable-erasable surface can be maintained by daily erasure and cleaning with a standard dry-erase eraser or a dry cloth. For periodic and more thorough cleaning, a damp cloth may be used.

If it is desired to strip off the writable-erasable surface or recoat any damaged surface, the original surface is deglossed by sanding the surface and priming before application of the dry erase coating.

OTHER IMPLEMENTATIONS

A number of implementations have been described. Nevertheless, it will be understood that various modifications can be made without departing from the spirit and scope of the disclosure. Accordingly, other implementations are within the scope of the following claims.

For example, while rollers have been described for applying the materials, brushes, pre-loaded applicators, or sprayers can be used. When sprayers are used, the precursor materials can be first mixed and then sprayed onto a substrate, or the precursors materials can each be sprayed from separate nozzle outlet, the mixing of the precursors occurring in flight toward the substrate and/or on the substrate.

Figure 3:
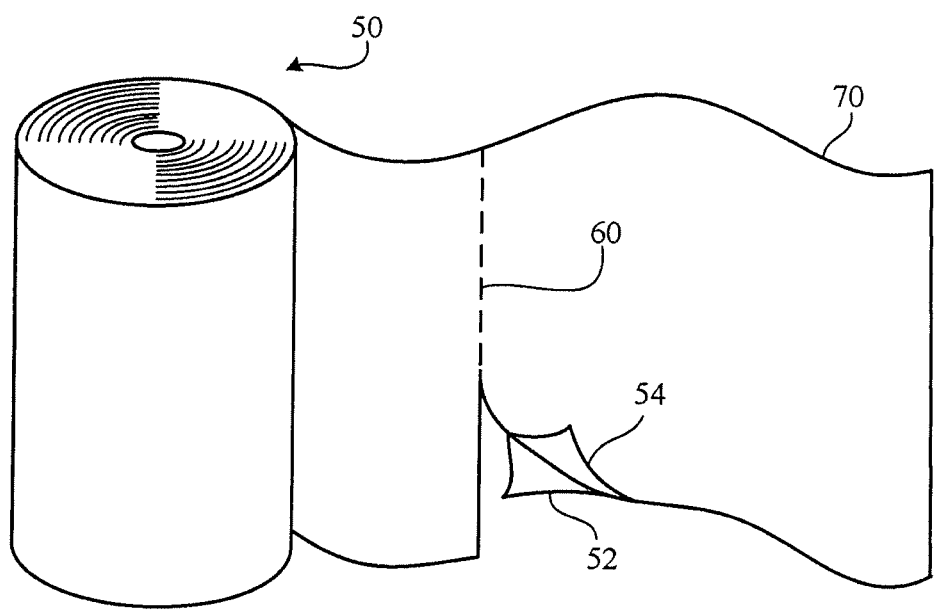
FIG. 3 is a perspective view of a coated roll of paper.
Figure 4:
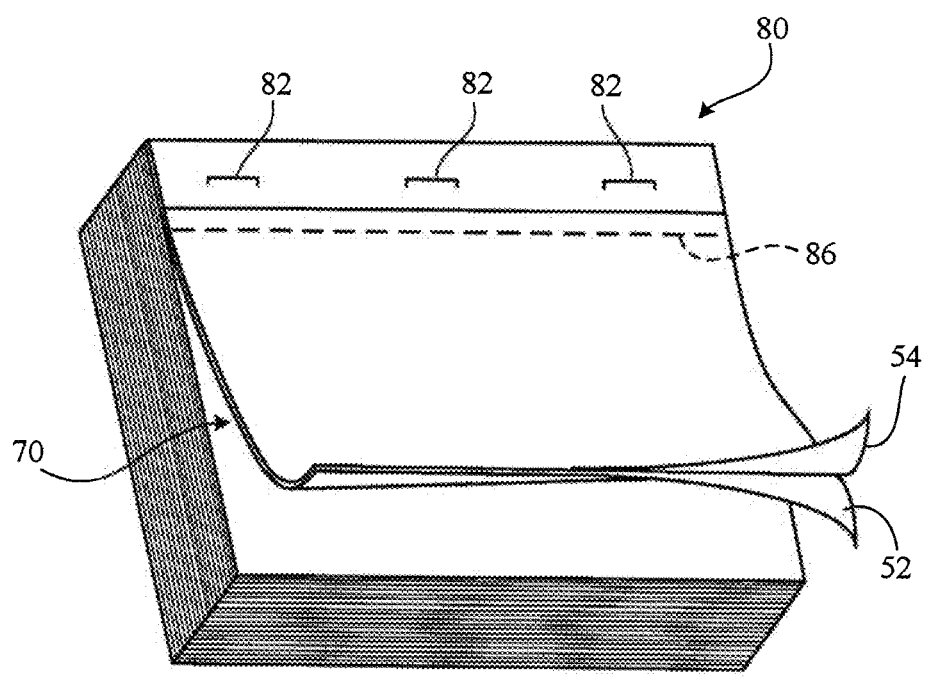
FIG. 4 is a perspective view of a tablet of coated papers formed from the roll of FIG. 3.

While whiteboards and coated walls have been described, the coatings can be applied to other forms. For example, referring now to FIG. 3, any of the materials described herein can be applied to a continuous sheet of material, such as paper, to provide a product 50 that includes a substrate 52 and a coating 54 extending upon the substrate 52. As shown in FIG. 3, the product 50 can be conveniently stored in a roll form. If desired, product 50 can be cut, e.g., along a transverse line 60, to provide individual sheets 70 of material. Referring now to FIG. 4, sheets 70 can be fashioned into a product 80 in tablet form using fasteners 82. If desired, the assembled sheets can have perforations 86, allowing sheets to be torn from the tablet and used as a mobile writable-erasable product.

Blends of polyurethane materials and any one of, some of, or all of epoxy resins, acrylic resins described herein can be used to make the coatings having the writable-erasable surface.

Other solvent-based materials may be used alone, or in combination with other solvent-based materials described herein, such as polyurethane materials. For example, epoxy resins in a solvent-based carrier may be utilized. These epoxy resins may be used in conjunction with various cross-linkers and/or additives described herein. For example, the cross-linkers can be a moiety that includes a plurality of amino groups, thiol groups, hydroxyl groups or mixtures of such groups. Water-based epoxy resins are commercially available under the name Enducryl® from Epoxy Systems, Inc.

The first and second components can be applied to the substrate, e.g., by concurrently spraying the components so that they mix in flight and/or on the substrate, and then optionally applying a cross-linking promoter, such as an acid, to the mixed first and second components, e.g., in the form of a solution. In still other implementations, a cross-linking promoter is first applied to the substrate, and then the first and second components are applied to the substrate having the cross-linking promoter.

The first and second components can be mixed, e.g., by alternately adding the desired, pre-determined quantities of the components from a large drum to a paint bucket, mixing, and then applying the coating on a substrate. The advantage of this method is that the pot life of the components are preserved without wasting the components.

Still other implementations are within the scope of the following claims.

What is claimed is:

1. A method of forming a coating having a write-erasable surface on a substrate comprising:
    combining an isocyanate resin component and an acrylic polyol resin component in relative amounts with respect to each other to produce a composition, wherein the composition is in an organic solvent-based carrier, and further wherein
    a) the isocyanate resin component comprises 20-40% by weight of the composition, and
    b) the acrylic polyol resin component comprises 10-20% by weight of the composition;
    applying the composition to a substrate, to cure under ambient conditions so that a coating having a write-erasable surface is produced on the substrate, the coating being characterized by:
    a gloss finish greater than 65 when measured at 60°;
    an average surface roughness of less than 7,500 nm and a maximum surface roughness of less than 10,000 nm;
    a Sward hardness of greater than about 10;
    a Taber abrasion of less than 150 mg/thousand cycles;
    an elongation at break is between about 5 percent and about 400 percent;
    a sag resistance is between about 4 mils to about 24 mils; and
    a contact angle measured using deionized water of less than about 150 degree,
    and so that after the coating is marked with a marking material comprising a colorant and a solvent, the marking material can be erased from the write-erasable surface to be effectively invisible.

2. The method of claim 1, wherein the step of combining comprises:
    obtaining a first material comprising the isocyanate resin component;
    obtaining a second material, physically separate from the first material, that comprises the acrylic polyol resin component; and
    combining the first and second materials with one another.

3. The method of claim 2, wherein the first and second materials are maintained physically separate from one another in first and second containers.

4. The method of claim 1, wherein the second material further comprises a cross-linking agent.

5. The method of claim 1, wherein the isocyanate resin component is selected from the group consisting of hexamethylene diisocyanate (HDI), tetramethylene diisocyanate, octamethylene diisocyanate, decamethylene diisocyanate, 2-methylpentane-1,5-diisocyanate, toluene diisocyanate (TDI), diphenylmethane diisocyanate (MDI), m- and p-phenylene diisocyanates, bitolylene diisocyanate, cyclohexane diisocyanate (CHDI), bis-(isocyanatomethyl) cyclohexane (H6XDI), dicyclohexylmethane diisocyanate (H12MDI), dimer acid diisocyanate (DDI), trimethyl hexamethylene diisocyanate, lysine diisocyanate and its methyl ester, methyl cyclohexane diisocyanate, 1,5-napthalene diisocyanate, xylene diisocyanate, polyphenylene diisocyanates, isophorone diisocyanate (IPDI), hydrogenated methylene diphenyl isocyanate (HMDI), tetramethyl xylene diisocyanate (TMXDI), oligomers and homopolymers of any of the foregoing, and mixtures thereof.

6. The method of claim 1, wherein the isocyanate resin component is selected from the group consisting of an aliphatic diisocyanate, its oligomer, its homopolymer, and mixtures thereof.

7. The method of claim 1, wherein the isocyanate resin component is a hexamethylene-1,6-diisocyanate homopolymer.

8. The method of claim 1, wherein the solvent-based carrier is selected from the group consisting of hydrocarbons, alcohols, ketones, esters, mineral spirits, bio-based solvents, and mixtures thereof.

9. The method of claim 1, wherein the solvent-based carrier is selected from the group consisting of ethyl benzene, xylene, n-butyl acetate, methyl iso-amyl ketone, Stoddard solvent, t-butyl acetate, acetone, isopropyl alcohol, 2-butoxyethanol, toluene, methanol, propanol, 2-butanol, iso-amyl alcohol, methyl amyl alcohol, pentane, heptane, odorless mineral spirits, methyl ethyl ketone, diacetone alcohol, methyl amyl ketone, ethyl amyl ketone, diisobutyl ketone, methyl heptyl ketone, ethyl acetate, isopropyl acetate, propyl acetate, isobutyl acetate, n-butyl acetate, glycol ether EM acetate, amyl acetate, isobutyl isobutyrate, glycol ether EE acetate, Glycol ether EB acetate, 2-ethylhexyl acetate, glycol ether DE acetate, Glycol DB acetate, methyl isobutyl ketone, dipropylene glycol butoxy ether, vegetable oil, corn oil, sunflower oil, and mixtures thereof.

10. The method of claim 1, wherein the step of combining further comprises combining an accelerator with the isocyanate resin component and the acrylic polyol resin component.

11. The method of claim 10, wherein the accelerator comprises dibutyltin dilaurate.

12. The method of claim 1, wherein the step of combining further comprises combining an acid promoter with the isocyanate resin component and the acrylic polyol resin component.

13. The method of claim 12, wherein the acid promoter comprises propionic acid.

14. The method of claim 1, wherein the step of combining further comprises combining titanium dioxide, a surface additive, a wetting agent, or a defoaming agent with the isocyanate resin component and the acrylic polyol resin component.

15. The method of claim 1, wherein the step of combining further comprises combining a pigment or a colorant with the isocyanate resin component and the acrylic polyol resin component.

16. The method of claim 1, wherein the coating is characterized in that, the marking material can be erased from the write-erasable surface to be substantially invisible after writing and erasing at the same position for more than about 100 cycles.

17. The method of claim 1, wherein the coating is characterized in that, the marking material can be erased from the write-erasable surface to be substantially invisible after writing and erasing at the same position for more than about 5,000 cycles.

18. The method of claim 1, wherein the substrate is selected from the group consisting of cellulosic material, glass, wall, fiber board, particle board, gypsum board, wood, plastic, densified ceramics, stone, and metal.

19. The method of claim 1, wherein the substrate comprises a flexible film or a rigid structure.

20. The method of claim 1, wherein the step of applying comprises rolling, painting, spraying or any combination thereof.

21. The method of claim 1, further comprising a step of permitting the composition to cure.

22. The method of claim 1, further comprising a step of writing with the marking material on the write-erasable surface.

23. The method of claim 22, further comprising a step of erasing the marking material.

24. The method of claim 1, wherein the step of applying comprises forming a coating having a thickness of at least 20 mil.

* * * * *

UNITED STATES PATENT AND TRADEMARK OFFICE
CERTIFICATE OF CORRECTION

| | | |
|---|---|---|
| PATENT NO. | : 9,056,519 B2 | Page 1 of 1 |
| APPLICATION NO. | : 12/505167 | |
| DATED | : June 16, 2015 | |
| INVENTOR(S) | : John Goscha et al. | |

It is certified that error appears in the above-identified patent and that said Letters Patent is hereby corrected as shown below:

In the claims

Please correct claim 4 from:

"The method of claim 1, wherein the second material further comprises a cross-linking agent."

to read:

--The method of claim 2, wherein the second material further comprises a cross-linking agent.--

Signed and Sealed this
Twentieth Day of October, 2015

Michelle K. Lee
*Director of the United States Patent and Trademark Office*